(12) United States Patent
Gao et al.

(10) Patent No.: US 11,250,795 B2
(45) Date of Patent: Feb. 15, 2022

(54) ELECTRONIC PAPER DISPLAY APPARATUS AND METHOD OF DRIVING THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yinan Gao, Beijing (CN); Qingqing Ma, Beijing (CN); Shuo Li, Beijing (CN); Chao Tian, Beijing (CN); Guojie Qin, Beijing (CN); Xiang Yuan, Beijing (CN); Junpeng Han, Beijing (CN); Tianjiao Wang, Beijing (CN); Yin Yuan, Beijing (CN); Lizhong Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/912,264

(22) Filed: Jun. 25, 2020

(65) Prior Publication Data
US 2021/0142740 A1    May 13, 2021

(30) Foreign Application Priority Data
Nov. 13, 2019   (CN) .......................... 201911104804.5

(51) Int. Cl.
*G09G 3/34*     (2006.01)
*G02F 1/1675*   (2019.01)
*G02F 1/167*    (2019.01)
*G09G 3/20*     (2006.01)

(52) U.S. Cl.
CPC ............. *G09G 3/344* (2013.01); *G02F 1/167* (2013.01); *G02F 1/1675* (2019.01); *G09G 3/2003* (2013.01); *G09G 2320/0666* (2013.01)

(58) Field of Classification Search
CPC .......................................... G09G 3/3433–346
See application file for complete search history.

(56) References Cited

U.S. PATENT DOCUMENTS

2008/0278436 A1*  11/2008  Sato ........................ G09G 3/344
                                                                  345/107
2019/0333436 A1*  10/2019  Wang ........................ G09G 3/34

* cited by examiner

*Primary Examiner* — Roy P Rabindranath
(74) *Attorney, Agent, or Firm* — Procopio, Cory, Hargreaves & Savitch, LLP

(57) ABSTRACT

A method of driving an electronic paper display apparatus includes: providing a preprocessing signal in the first pulse signal to the first electrode in the display stage of the first image display stage, so that the first particles and the third particles are mixed, and the first particles and the third particles are closer to a display side of the display apparatus than the second particles; and providing a first sub-pulse signal in the first pulse signal to the first electrode in the display stage of the first image display stage after providing the preprocessing signal, so that the third particles are closer to the display side of the display apparatus than the first particles and the second particles and the microcup displays the third color.

19 Claims, 18 Drawing Sheets

A controller provides a preprocessing signal 011 in a first pulse signal 01 to the first electrode 11 in a display stage T1 of a first image display stage, so that the first particles 101 and the third particles 103 are mixed, and the first particles 101 and the third particles 103 are closer to a display side of the electronic paper display apparatus 1 than the second particles 102. — S100

The controller provides a first sub-pulse signal 012 in the first pulse signal 01 to the first electrode 11 of the microcup 10 in the display stage T1 after the preprocessing signal 011, so that the third particles 103 are closer to the display side of the electronic paper display apparatus 1 than the first particles 101 and the second particles 102, and the microcup 10 displays the third color. — S200

FIG. 2

A controller provides a preprocessing signal 011 in a first pulse signal 01 to the first electrode 11 in a display stage T1 of a first image display stage, so that the first particles 101 and the third particles 103 are mixed, and the first particles 101 and the third particles 103 are closer to a display side of the electronic paper display apparatus 1 than the second particles 102. — S100

The controller provides a first sub-pulse signal 012 in the first pulse signal 01 to the first electrode 11 of the microcup 10 in the display stage T1 after the preprocessing signal 011, so that the third particles 103 are closer to the display side of the electronic paper display apparatus 1 than the first particles 101 and the second particles 102, and the microcup 10 displays the third color. — S200

The controller provides a third pulse signal 03 to the first electrode 11 of the microcup 10 in the display stage T1, so that the first particles 101 are closer to the display side of the electronic paper display apparatus 1 than the second particles 102 and the third particles 103, and the microcup 10 displays the first color. — S400

The controller provides a fourth pulse signal 04 to the first electrode 11 of the microcup 10 in the display stage T1, so that the second particles 102 are closer to the display side of the electronic paper display apparatus 1 than the first particles 101 and the third particles 103, and the microcup 10 displays the second color. — S500

FIG. 12

The controller receives a luminance value of the third color displayed by the microcup 10 in the display stage T1 detected for a first time, and increases the number of first pulse units 20 in the first sub-pulse signal 012 in response to determining that the luminance value of the third color displayed by the microcup 10 is not within a first preset luminance range to adjust the luminance of the third color for a first time. — S131

The controller receives a chromaticity value of the third color displayed by the microcup 10 in the display stage T1 detected for a first time, and increases a duration of the zero voltage in at least one first pulse unit 20 in the first sub-pulse signal 012 or a duration of the second voltage V2 in at least one second pulse unit 30 in the fourth sub-pulse signal 015 in response to determining that the chromaticity value of the third color displayed by the microcup 10 is not within a first preset chromaticity range, so as to adjust the chromaticity of the third color for a first time. — S132

FIG. 13

The controller receives a luminance value of the third color displayed by the microcup 10 in the display stage T1 detected for a first time, and increases the number of first pulse units 20 in the first sub-pulse signal 012 in response to determining that the luminance value of the third color displayed by the microcup 10 is not within a first preset luminance range to adjust the luminance of the third color for a first time. — S131

The controller receives a chromaticity value of the third color displayed by the microcup 10 in the display stage T1 detected for a first time, and increases a duration of the zero voltage in at least one first pulse unit 20 in the first sub-pulse signal 012 or a duration of the second voltage V2 in at least one second pulse unit 30 in the fourth sub-pulse signal 015 in response to determining that the chromaticity value of the third color displayed by the microcup 10 is not within a first preset chromaticity range, so as to adjust the chromaticity of the third color for a first time. — S132

The controller receives an adjusted luminance value and an adjusted chromaticity value of the third color displayed by the microcup 10 in the display stage T1 detected for a second time, and determines whether the adjusted luminance value of the third color displayed by the microcup 10 is within the first preset luminance range, and whether the adjusted chromaticity value of the third color displayed by the microcup 10 is within the first preset chromaticity range. — S133

The controller adjusts the duration of the second voltage V2 in the at least one second pulse unit 30 of the fourth sub-pulse signal 015 in response to determining that the adjusted luminance value of the third color displayed by the microcup 10 is not within the first preset luminance range, and/or the adjusted chromaticity value of the third color displayed by the microcup 10 is not within the first preset chromaticity range. — S134

FIG. 14

The controller receives a luminance value of the first color displayed by the microcup 10 in the display stage T1 detected for a first time, and increases the number of pulses of the third pulse signal 03 in the second sub-display stage t2 or a pulse width of each pulse in the third pulse signal 03 in the second sub-display stage t2 in response to determining that the luminance value of the first color displayed by the microcup 10 is not within a second preset luminance range, so as to adjust the luminance of the first color for a first time. — S151

The controller receives a chromaticity value of the first color displayed by the microcup 10 in the display stage T1 detected for a first time, and in response to determining that the chromaticity value of the first color displayed by the microcup 10 is not within a second preset chromaticity range, a duration of the effective voltage in each sub-pulse signal 40 of the third pulse signal 03 in the shaking stage T3, which has opposite polarity with respect to the effective voltage of the third pulse signal 03 in the display stage T1, and increases the pulse width of each pulse in the third pulse signal 03 in the second sub-display stage t2, so as to adjust the chromaticity of the first color for a first time. — S152

FIG. 15

S151 — The controller receives a luminance value of the first color displayed by the microcup 10 in the display stage T1 detected for a first time, and increases the number of pulses of the third pulse signal 03 in the second sub-display stage t2 or a pulse width of each pulse in the third pulse signal 03 in the second sub-display stage t2 in response to determining that the luminance value of the first color displayed by the microcup 10 is not within a second preset luminance range, so as to adjust the luminance of the first color for a first time.

S152 — The controller receives a chromaticity value of the first color displayed by the microcup 10 in the display stage T1 detected for a first time, and in response to determining that the chromaticity value of the first color displayed by the microcup 10 is not within a second preset chromaticity range, a duration of the effective voltage in each sub-pulse signal 40 of the third pulse signal 03 in the shaking stage T3, which has opposite polarity with respect to the effective voltage of the third pulse signal 03 in the display stage T1, and increases the pulse width of each pulse in the third pulse signal 03 in the second sub-display stage t2, so as to adjust the chromaticity of the first color for a first time.

S153 — The controller receives both the adjusted luminance value and the adjusted chromaticity value of the first color displayed by the microcup 10 in the display stage T1 that are detected for a second time, and determines whether the adjusted luminance value of the first color displayed by the microcup 10 is within the second preset luminance range, and whether the adjusted chromaticity value of the first color displayed by the microcup 10 is within the second preset chromaticity range.

S154 — The controller adjusts a pulse width of at least one pulse in the third pulse signal 03 in the second display stage T12 in response to determining that the adjusted luminance value of the first color displayed by the microcup 10 is not within the second preset luminance range, and/or the adjusted chromaticity value of the first color displayed by the microcup 10 is not within the second preset chromaticity range.

FIG. 16

The controller receives a luminance value of the second color displayed by the microcup 10 in the display stage T1 detected for a first time, and increases the number of pulses of the fourth pulse signal 04 in the second sub-display stage t2 or a pulse width of each pulse in the fourth pulse signal 04 in the second sub-display stage t2 in response to determining that the luminance value of the second color displayed by the microcup 10 is not within a third preset luminance range, so as to adjust the luminance of the second color for a first time. — S171

The controller receives a chromaticity value of the second color displayed by the microcup 10 in the display stage T1 detected for a first time, and increases a sum of times between any two adjacent pulses in the fourth pulse signal 04 in the first display stage T11 in response to determining that the chromaticity value of the second color displayed by the microcup 10 is not within a third preset chromaticity range to adjust the chromaticity of the second color for a first time. — S172

FIG. 17

The controller receives a luminance value of the second color displayed by the microcup 10 in the display stage T1 detected for a first time, and increases the number of pulses of the fourth pulse signal 04 in the second sub-display stage t2 or a pulse width of each pulse in the fourth pulse signal 04 in the second sub-display stage t2 in response to determining that the luminance value of the second color displayed by the microcup 10 is not within a third preset luminance range, so as to adjust the luminance of the second color for a first time. — S171

The controller receives a chromaticity value of the second color displayed by the microcup 10 in the display stage T1 detected for a first time, and increases a sum of times between any two adjacent pulses in the fourth pulse signal 04 in the first display stage T11 in response to determining that the chromaticity value of the second color displayed by the microcup 10 is not within a third preset chromaticity range to adjust the chromaticity of the second color for a first time. — S172

The controller receives both the adjusted luminance value and the adjusted chromaticity value of the second color displayed by the microcup 10 in the display stage T1 that are detected for a second time, and determines whether the adjusted luminance value of the second color displayed by the microcup 10 is within the third preset luminance range, and whether the adjusted chromaticity value of the second color is within the third preset chromaticity range. — S173

The controller adjusts a pulse width of at least one pulse in the fourth pulse signal 04 in the second display stage T12 in response to determining that the adjusted luminance value of the second color displayed by the microcup 10 is not within the third preset luminance range, and/or the adjusted chromaticity value of the second color displayed by the microcup 10 is not within the third preset chromaticity range. — S174

FIG. 18

ELECTRONIC PAPER DISPLAY APPARATUS AND METHOD OF DRIVING THE SAME

CROSS-REFERENCE TO RELATED APPLICATION

This application claims priority to Chinese Patent Application No. 201911104804.5, filed on Nov. 13, 2019, which is incorporated herein by reference in its entirety.

TECHNICAL FIELD

The present disclosure relates to the field of electronic paper display technologies, and in particular, to an electronic paper display apparatus and a method of driving the same.

BACKGROUND

Electronic paper (E-paper, also known as electronic ink) display apparatuses have effects of eye protection and, power saving, and thus have received widespread attention.

SUMMARY

On the one hand, a method of driving an electronic paper display apparatus is provided. The electronic paper display apparatus includes a microcup, a first electrode, a second electrode and a controller. The controller is connected to the first electrode. The first electrode and the second electrode are opposite to each other, and the microcup is disposed between the first electrode and the second electrode. The microcup includes first particles of a first color, second particles of a second color and third particles of a third, color. Charge polarity of the first particles is opposite to charge polarity of the second particles, and the charge polarity of the first particles is the same as charge polarity of the third particles. Specific charge of each first particle is greater than specific charge of each third particle. Mobility of the first particle is greater than mobility of the third particle. The method includes: providing, by the controller, the first pulse signal to the first electrode in a display stage of a first image display stage, which includes: providing, by the controller, a preprocessing signal in the first pulse signal to the first electrode in the display stage of the first image display stage so that the first particles and the third particles are mixed, and the first particles and the third particles are closer to a display side of the electronic paper display apparatus than the second particles and providing, by the controller, a first sub-pulse signal in the first pulse signal to the first electrode in the display stage of the first image display stage after providing the preprocessing signal, so that the third particles are closer to the display side of the display apparatus than the first particles and the second particles and the microcup displays the third color.

In some embodiments, providing, by a controller, a preprocessing signal to the first electrode, includes: providing, by the controller, a second sub-pulse signal to the first electrode, so that the first particles are closer to the display side of the display apparatus than the third particles and the third particles are closer to the display side of the electronic paper display apparatus than the second particles, wherein an effective voltage of the second sub-pulse signal is a positive voltage or a negative voltage; and providing, by the controller, a third sub-pulse signal to the first electrode after providing the second sub-pulse signal, wherein the third sub-pulse signal is a pulse signal with alternating positive and negative voltages, an absolute value of a positive voltage of the third sub-pulse signal is equal to an absolute value of a negative voltage of the third sub-pulse signal, and a duty ratio of the third sub-pulse signal is 0.5.

In some embodiments, providing, by the controller, a first sub-pulse signal to the first electrode, includes: providing continuously and sequentially, by the controller, a first voltage and a second voltage that are included in a first pulse unit to the first electrode at least once. A duration of the first voltage in the first pulse unit is less than a duration of the second voltage in the first pulse unit; and polarity of the first voltage in the first pulse, unit is opposite to polarity of the effective voltage of the second sub-pulse signal, polarity of the second voltage in the first pulse unit is the same as the polarity of the effective voltage of the second sub-pulse signal, and the second voltage in the first pulse unit is less than the effective voltage of the second sub-pulse signal.

In some embodiments, after providing the second voltage in the first pulse unit to the first electrode, providing, by the controller, a first sub-pulse signal to the first electrode, further includes: providing, by the controller, a zero voltage in the first pulse unit to the first electrode.

In some embodiments, after providing the first sub-pulse signal to the first electrode in the display stage of the first image display stage, the method further includes: providing, by the controller, a fourth sub-pulse signal in the first pulse signal to the first electrode in the display stage of the first image display stage. The fourth sub-pulse signal includes a plurality of second pulse units, each second pulse unit includes a first voltage, a second voltage and a zero voltage that are sequentially applied to the first electrode, and a duration of the first voltage in the second pulse unit is less than a duration of the second, voltage in the second pulse unit. In the plurality of second pulse units, durations of first voltages are gradually reduced in an order in which the plurality of second pulse units are applied to the first electrode, durations of second voltages are gradually reduced in the order, and durations of all zero voltages are gradually reduced in the order.

In some embodiments, before providing the first pulse signal to the first electrode. the method further includes: receiving, by the controller, an ambient temperature; and determining by the controller, whether the ambient temperature is within a preset temperature range of 0° C. to 10° C., and providing, by the controller, the first pulse signal to the first electrode, includes: providing, by the controller, the first pulse signal to the first electrode in response to determining that the ambient temperature is within the preset temperature range.

In some embodiments, the method further includes: providing, by the controller, a six sub-pulse signal to the first electrode in the display stage of the first image display stage in response to determining that the ambient temperature is greater than a maximum temperature in the preset temperature range. The sixth sub-pulse signal includes a six sub-pulse signal including at least one third pulse unit, and each third pulse unit includes a third voltage and a fourth voltage, and the third voltage and the fourth voltage are sequentially applied to the first electrode. A duration of the third voltage in the third pulse unit is less than, a duration of the fourth voltage in the third pulse, unit; and polarity and a value of the third voltage in the third pulse unit are the same as the polarity and a value of the first voltage in the first sub-pulse signal respectively, polarity of the fourth voltage in the third pulse unit is the same as the polarity of the second voltage in the first sub-pulse signal, and an absolute value of the fourth voltage in the third pulse unit is less than the absolute value of the second voltage in the first, sub-pulse signal.

In some embodiments, the method further includes: providing, by the controller, a third pulse signal to the first electrode in a display stage of a second image display stage, so that the first particles are closer to the display side of the display apparatus than the second particles and the third particles, and the microcup displays the first color; and providing, by the controller, a fourth pulse signal to the first electrode in a display stage of a third image display stage, so that the second particles are closer to the display side of the display apparatus than the, first particles and the third particles, and the microcup displays the second color.

In some embodiments, providing, by the controller, the preprocessing signal and the first sub-pulse signal to the first electrode in the display stage of the first image display stage, includes: providing, by the controller, the second sub-pulse signal to the first electrode in a first sub-display stage of a first display stage in the display stage of the first image display stage, and providing, by the controller, the third sub-pulse signal and the first sub-pulse signal continuously to the first electrode in a second sub-display stage of the first display stage.

An effective voltage of the third pulse signal in the display stage of the second image display stage is a positive voltage or a negative voltage, and polarity of the effective voltage in the third pulse signal is the same as polarity of the effective voltage in the second sub-pulse signal.

The third pulse signal includes a plurality of pulses, a pulse width of each pulse in the third pulse signal in a first sub-display stage of a first display stage in the display stage of the second image display stage is the same, and a pulse width of each pulse in the third pulse signal in a second sub-display stage of the first display stage of the display stage of the second image display stage is the same; and the pulse width of each pulse in the third pulse signal in the first sub-display stage is greater than the pulse width of each pulse in the third pulse signal in the second sub-display stage In the display stage of the third image display stage, an effective voltage in the fourth pulse signal is a positive voltage or a negative voltage., and polarity of the effective voltage in the fourth pulse signal is opposite to the polarity of the effective voltage in the second sub-pulse signal, The fourth pulse signal includes a plurality of pulses, a pulse width of each pulse in the fourth pulse signal in a first sub-display stage of a first display stage in the display stage of the third image display stage is the same, and a pulse width of each pulse in the fourth pulse signal in a second sub-display stage of the first display stage in the display stage of the third image display stage is the same; and the pulse width of each pulse in the fourth pulse signal in the first sub-display stage is greater than the pulse width of each pulse in the fourth pulse signal in the second sub-display stage.

In some embodiments, each of display stages of the first image display stage, the second image display stage and the third image display stage further includes a second display stage following the first display stage. The third pulse signal includes at least one pulse in the second display stage of the second image display stage, and a pulse width of each pulse in the third pulse signal in the second display stage of the second image display stage is less than the pulse width of each pulse in the third pulse signal in the second sub-display stage of the second image display stage. The fourth pulse signal includes at least one pulse in the second display stage of the third image display stage, and a pulse width of each pulse in the fourth pulse signal in the second display stage of the third image display stage is less than the pulse width of each pulse in the fourth pulse signal in the second sub-display stage of the third image display stage.

In some embodiments, before the display stage of the first image display stage, the method further includes: providing, by the controller, a fifth sub-pulse signal to the first electrode in a balance stage of the first image display stage. Polarity of an effective voltage in the fifth sub-pulse signal is the same as the polarity of the first voltage in the first sub-pulse signal, and a product of an absolute value of the effective voltage in the fifth sub-pulse signal and a total time of the effective voltage in the fifth sub-pulse signal is equal to an absolute value of a difference between a product of an absolute value of the first voltage in both the first sub-pulse signal and the fourth sub-pulse signal and a total time of the first voltage in both the first sub-pulse signal and the fourth sub-pulse signal and a product of an absolute value of the second voltage in both the first sub-pulse signal and the fourth sub-pulse signal and a total time of the second voltage in both the first sub-pulse signal and the fourth sub-pulse signal.

In some embodiments, the effective voltage in the fifth sub-pulse signal is equal to the first voltage in the first sub-pulse signal.

In some embodiments, each of the first image display stage, the second image display stage and the third image display stage further includes a balance stage preceding the display stage. Polarity of an effective voltage in the third pulse signal in the balance stage in the second image display stage is opposite to polarity of an effective voltage in the third pulse signal in the display stage in the second image display stage; a product of an absolute value of the effective voltage in the third pulse signal in the balance stage in the second image display, stage and a total time of the effective voltage in the third pulse signal in the balance stage in the second image display stage is equal to a product of an absolute value of the effective voltage in the third pulse signal in the display stage in the second image display stage and the total time of the effective voltage in the third pulse signal in the display stage in the second image display stage. Polarity of an effective voltage in the fourth pulse signal in the balance stage in the third image display stage is opposite to polarity of an effective voltage in the fourth pulse signal in the display stage in the third image display stage; a product of an absolute value of the effective voltage in the fourth pulse signal in the balance stage in the third image display stage and a total time of the effective voltage in the fourth pulse signal in the balance stage in the third image display stage is equal to a product of an absolute value of the effective voltage in the fourth pulse signal in the display stage in the third image display stage and the total time of the effective voltage in the fourth pulse signal in the display stage, in the third image display stage.

In some, embodiments, the absolute value of the effective voltage in the third pulse signal in the balance stage in the second image display stage is equal to the absolute value of the effective voltage in the third pulse signal in the display stage in the second image display stage. The absolute value of the effective voltage in the fourth pulse signal in the balance stage in the third image display stage is equal to the absolute value of the effective voltage in the fourth pulse signal in the display stage in the third image display stage.

In some embodiments, before the display stage of the first image display stage and after the balance stage of the first image display stage, the method further includes: providing a plurality of sub-pulse signals in the first pulse signal to the first electrode in a shaking stage of the first image display stage; before the display stage of the second image display stage and after the balance stage of the second image display stage, the method further includes: providing a plurality of sub-pulse signals in the third pulse signal to the first electrode in a shaking stage of the second image display stage; and before the display stage of the third image display stage and after the balance stage of the third image display stage, the method further includes: providing a plurality of sub-pulse signals in the fourth pulse signal to the first electrode in a shaking stage of the third image display stage. Each sub-pulse signal includes alternating positive and negative voltages, pulse widths of the, plurality of sub-pulse signals are gradually increased in an order in which the plurality of sub-pulse signals are applied to the first electrode and duty ratios of the first pulse signal, the third pulse, signal and the fourth pulse signal in the shaking stage are all 0.5.

In some embodiments, the method further includes: receiving, by the controller, a luminance value of the third color displayed by the microcup in the display stage of the first image display stage, which is detected for a first time; determining, by the controller, whether the luminance value of the third color is within a first preset luminance range; increasing, by the controller, a number of first pulse units in the first sub-pulse signal in response to determining that the luminance value of the third color is not within the first preset luminance range: receiving, by the controller, a chromaticity value of the third color displayed by the microcup in the display stage of the first image display stage, which is detected for a first time:, determining, by the controller, whether the chromaticity value of the third color is within a first preset chromaticity range; and increasing, by the controller a duration of a zero voltage in at least one first pulse unit or increasing, by the controller, a duration of a second voltage in at least one second pulse unit in response to determining that the chromaticity value of the third color is not within the first preset chromaticity range.

In some embodiments, after luminance and the chromaticity of the third color displayed by the microcup are adjusted for a first time, the method further includes: receiving, by the controller, an adjusted luminance value and an adjusted chromaticity value of the third color displayed by the microcup in the display stage of the first image display stage, which are detected for a second time; determining, by the controller, whether the adjusted luminance value of the third color is within the first preset luminance range; determining, by the controller, whether the adjusted chromaticity value of the third color is within the first preset chromaticity range; and adjusting the duration of the second voltage in the at least one second pulse unit in response to determining that the adjusted luminance value of the third color is not within the first preset luminance range, and/or the adjusted chromaticity value of the third color is not within the first preset chromaticity range.

In some embodiments, the method further includes: receiving, by the controller, a luminance value of the first color displayed by the microcup in the display stage of the second image display stage, which is detected for the first time; determining, by the controller, whether the luminance value of the first color is within a second preset luminance range, increasing, by the controller, a number of pulses in the third pulse signal in the second sub-display stage of the second image display stage or increasing, by the controller, a pulse width of each pulse in the third pulse signal in the second sub-display stage of the second image display stage in response to determining that the luminance value of the first color is not within the second preset luminance range; and receiving, by the controller, a chromaticity value of the first color displayed by the microcup in the display stage of the second image display stage, which is detected for the first time: determining, by the controller, whether the chromaticity value of the first color is within a second preset chromaticity range: increasing, by the controller, a duration of an effective voltage in the third pulse signal in the shaking stage that has opposite polarity with respect to the effective voltage in the third pulse signal in the display stage in response to determining that the chromaticity value of the first color is not within the second preset chromaticity range; adjusting, by the controller, a pulse width of each pulse in the third pulse signal in the second sub-display stage; receiving, by the controller, a luminance value of the second color displayed by the microcup in the display stage of the third image display stage, which is detected for the first time; determining, by the controller, whether the luminance value of the second color is within a third preset luminance range; increasing, by the controller, a number of pulses in the fourth pulse signal in the second sub-display stage or increasing, by the controller, a pulse width of each pulse in the fourth pulse signal in the second, sub-display stage in response to determining that the luminance value of the second color is not within the third preset luminance range; and receiving, by the controller, a chromaticity value of the second color displayed by the microcup in the display stage of the third image display stage, which is detected for the first time; determining, by the controller, whether the chromaticity value of the second color is within a third preset chromaticity range; increasing, by the controller, a sum of times between any two adjacent pulses in the fourth pulse signal in the first display stage in response to determining that the chromaticity value of the second color is not within the third preset chromaticity range.

In some embodiments, after luminance and chromaticity of the first color are adjusted for a first time, the method further includes: receiving, by the controller, an adjusted luminance value and an adjusted chromaticity value of the first color displayed by the microcup in the display stage of the second image display stage, which is detected for a second time; determining, by the controller, whether the adjusted luminance value of the first color is within the second preset luminance range; determining, by the controller, whether the adjusted chromaticity value of the first color is within the second preset chromaticity range; and adjusting, by the controller, a pulse width of at least one pulse in the third pulse signal in the second display stage of the second image display stage in response to determining that the adjusted luminance value of the first color is not within the second preset luminance range, and/or the adjusted chromaticity value of the first color is not within the second preset chromaticity range. After luminance and chromaticity of the second color are adjusted for a first time, the method further includes receiving, by the controller, an adjusted luminance value and an adjusted chromaticity value of the second color displayed by the microcup in the display stage of the third image display stage, which is detected for a second time; determining, by the controller, whether the adjusted luminance value of the second color is within the third preset luminance range; determining, by the controller, whether the adjusted chromaticity value of the second color is within the third preset chromaticity range; and adjusting, by the controller, a pulse width of at least one pulse in the fourth pulse signal in the second display stage of the third image display stage in response to determining that the adjusted luminance value of the second color is not within the third preset luminance range, and/or the adjusted chromaticity value of the second color is not within the third preset chromaticity range.

On the other hand, an electronic paper display apparatus is provided. The electronic paper display apparatus includes a plurality of microcups, a temperature sensor and a controller. A microcup includes a first electrode, a second electrode, a microcup, a temperature sensor and a controller. The first electrode and the second electrode are disposed opposite to each other. The microcup is between the first electrode and the second electrode. The microcup includes first particles of a first color, second particles of a second color and third particles of a third color. Charge polarity of the first particles is opposite to charge polarity of the second particles, and the charge polarity of the first particles is the same as charge polarity of the third particles. Specific charge of each first particle is greater than specific charge of each third particle. Mobility of the first particle is greater than mobility of the third particle. The temperature sensor is configured to detect an ambient temperature. The controller is connected to the first electrode and the temperature sensor, and the controller is configured to perform the method as described above.

BRIEF DESCRIPTION OF THE DRAWINGS

In order to describe technical solutions in the embodiments of the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, accompanying drawings in the following description may be regarded as schematic diagrams, and are not limitations on an actual size of a product, an actual process of a method and an actual timing of signals involved in the embodiments of the present disclosure.

FIG. 2 is a flow diagram of a method of driving an electronic paper display apparatus, according to some embodiments;

FIG. 12 is a flow diagram of yet another method of driving an electronic paper display apparatus, according to some embodiments;

FIG. 13 is a flow diagram of yet another method of driving an electronic paper display apparatus, according to some embodiments;

FIG. 14 is a flow diagram of yet another method of, driving an electronic paper display apparatus, according to some embodiments;

FIG. 15 is a flow diagram of yet another method of driving an electronic paper display apparatus, according to some embodiments;

FIG. 16 is a flow diagram of yet another method of driving an electronic paper display apparatus, according to some embodiments;

FIG. 17 is a flow diagram of yet another method of driving an electronic paper display apparatus, according to some embodiments;

FIG. 18 is a flow diagram of yet another method of driving an electronic paper display apparatus, according to some embodiments;

DETAILED DESCRIPTION

Technical solutions in some embodiments of the present disclosure will be described clearly and completely with reference to the accompanying drawings. However, the described embodiments are merely some but not all of embodiments of the present disclosure. All other embodiments obtained by a person of ordinary skill in the art based on the embodiments provided by the present disclosure shall be included in the protection scope of the present disclosure.

Unless the context requires otherwise, throughout the specification and the claims, the term "comprise/include" and other forms thereof such as the third-person singular form "comprises/includes" and the present participle form "comprising/including" are construed as open-ended and inclusive, "included, but not limited to". In the description of the specification, terms such as "one embodiment" "some embodiments", "exemplary embodiments", "example", "specific example" or "some examples" are intended to indicate that specific features, structures, materials or characteristics related to the embodiment(s) or the example(s) are included in at least one embodiment or example of the present disclosure. Schematic representations of the above terms do not necessarily refer to the same embodiment or example. In addition the specific features, structures, materials or characteristics may be included in any or more embodiments/examples in any suitable manner.

Terms such as "first" and "second" are only used for descriptive ,purposes, and are not to be construed as indicating or implying the relative importance or implicitly indicating the number of indicated technical features below. Thus, features defined as "first" and "second" may explicitly or implicitly include one or more of the features. In, the description of the embodiments of the present disclosure the term "a plurality of" means two or more unless otherwise specified.

Terms, such as "and", "or" or "and/or" as used herein may include a variety of meanings that may depend at least in part upon the context in which such terms are used. Typically, "or" if used to associate a list, such as A, B or C. is intended to mean A, B, and C, here used in the inclusive sense, as well as A, B or C, here used in the exclusive sense. "And/or" if used to associate a list, such as "A and/or B", should be understood to mean only A only B, or A and B. That is, "A and/or B" includes three relationships.

Figure 1A:
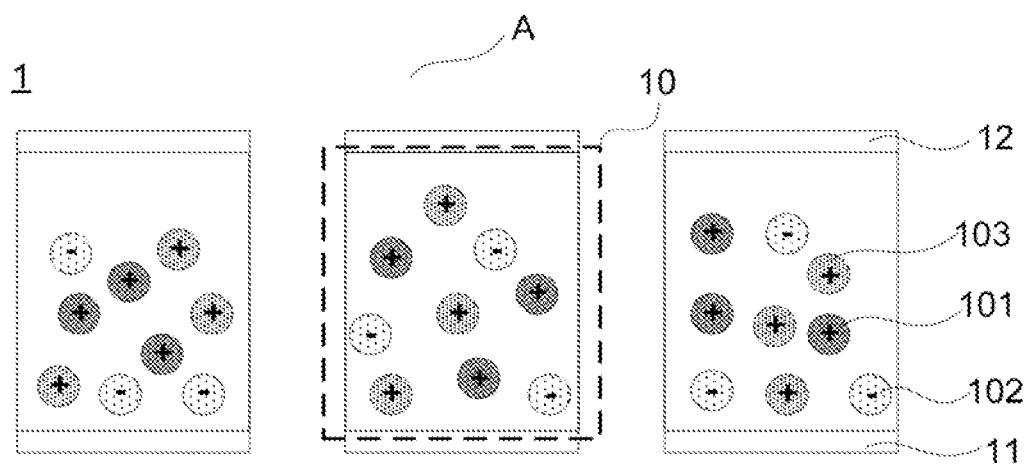
FIG. 1A is a schematic structural diagram of an electronic paper display apparatus, according to some embodiments.
Figure 1B:
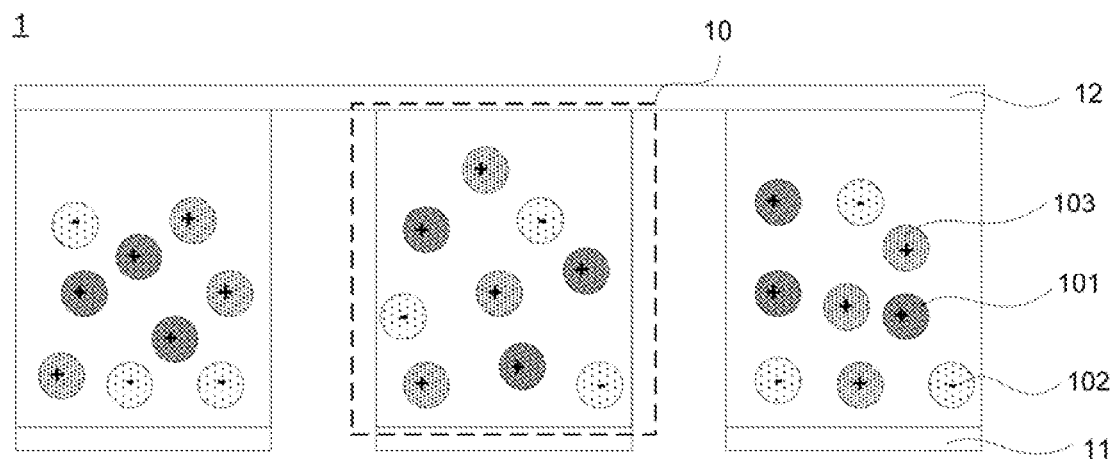
FIG. 1B is a schematic structural diagram of another electronic paper display apparatus, according to some embodiments.

As shown in FIGS. 1A and 1B, the electronic paper display apparatus 1 includes a plurality of first electrodes 11, at least one second electrode 12, and a plurality of microcups 10. For example, as shown in FIG. 1B, the at least one second electrode 12 includes one second electrode 12, and the microcup 10 is disposed between a first electrode 11 and the second electrode 12. In this case, the second electrode 12 may be referred to as a common electrode (also referred to as a Vcom electrode). For another example, as shown in FIG. 1A, the at least one second electrode 12 includes a plurality of second electrodes 12, and the microcup 10 is disposed between a first electrode 11 and a second electrode 12 that are disposed opposite to each other.

The plurality of second electrodes 12 may be electrically connected. in this case, a voltage signal provided to each second electrode 12 is the same. Or, the plurality of second electrodes 12 may be insulated from each other, and voltage signals provided to the second electrodes 12 may be the same, or may not be completely the same, or may be completely different. In some embodiments, the at least one second electrode 12 is grounded.

In some examples, the first electrode 11 is closer to the display side A of the electronic paper display apparatus 1 than the second electrode 12, In some other examples, as shown in FIG. 1A, the second electrode 12 is closer to the display side A of the electronic paper display apparatus 1 than the first electrode 11. The display side means a side of the electronic paper display apparatus where a user can watch an image on it.

In this case, one of the first electrode 11 and the second electrode 12 which is closer to the display side A of the electronic paper display apparatus 1 is a transparent electrode, and the other one which is away from the display side A of the electronic paper display apparatus 1 ray be a transparent electrode or a non-transparent electrode.

The embodiments are described below by taking an example in which each second electrode 12 is closer to the display side A of the electronic paper display apparatus 1 than the first electrode 11, and the second electrode 12 is grounded as shown in FIG. 1A.

As shown in FIGS. 1A and 1B, the microcup 10 may include liquid, such as dielectric liquid, which may be referred to related technologies. The microcup 10 further includes first particles 101 of a first color, second particles 102 of a second color and third particles 103 of a third color in the liquid. Colors of the first particles 101, the second particles 102 and the third particles 103 may be different from each other. For example, the first particles 101 are black particles, the second particles 102 are white particles, and the third particles 103 are red particles. In this case, the electronic paper display apparatus 1 can implement black, white and red display.

The first particles 101 and the second particles 102 carry opposite charge polarities, and the first particles 101 and the third particles 103 carry a same charge polarity. The charge polarity of the first particles 101, the charge polarity of the second particles 102 and the charge polarity of the third particles 103 are not limited. For example, as shown in FIG. 1A, the first particles 101 and the third particles 103 are positively charged and the second particles 102 are negatively charged, or the first particles 101 and the third particles 103 are negatively charged and the second particles 102 are positively charged.

Specific charge of the first particle 101 is greater than specific charge of the third particle 103. The specific charge refers to the ratio of the charge on a particle to the mass of the particle, i.e.,a charge-mass ratio of the particle, Therefore, the moving speed of the first particles 101 may be greater than the moving speed of the third particles 103 at a given electric field strength.

The mobility of the third particle 103 is less than the mobility of the first particle 101. The mobility refers to the rate at which the particle moves per unit of electric field strength. The faster the particle moves at a given electric field strength, the larger the mobility. Therefore, the moving speed of the first particles 101 may be eater than the; moving speed of the third particles 103 at a given electric field strength.

The mobility may vary with temperature. The difference between mobility of the third particle 103 in a normal temperature and mobility of the third particle 103 in a low temperature may be greater than a difference between the mobility of the first particle 101 in the normal temperature and mobility of the first particle 101 in the low temperature. The normal temperature may be a room temperature (which is in a range of approximately 18° C. to approximately 25° C.) or in a range of 10° C. to 50° C., especially 20° C. to 40° C., such as 12° C., 20° C., 25° C., 30° C., 35° C. or 40° C. The low temperature may be in a range of 0° C. to 10° C., inclusive (i.e., a low temperature environment), such as 0° C., 2° C., 4° C., 6° C., 8° C. or 10° C. Therefore, in an example where the temperature is reduced to any temperature in the range of 0° C. to 10° C., the mobility of the third particles 103 may be obviously lower than the mobility of the first particles 101.

Figure 20:
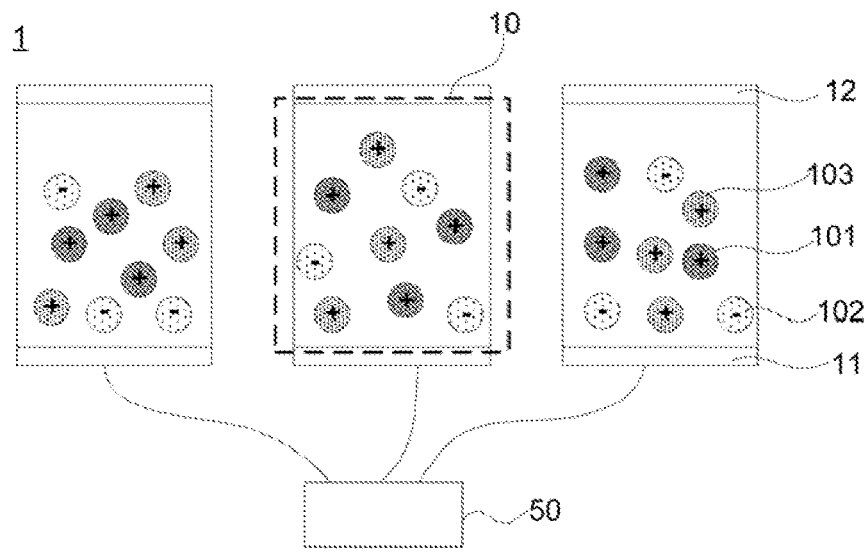
FIG. 20 is a schematic structural diagram of another electronic paper display apparatus, according to some embodiments.

In some embodiments, as shown in FIG. 20, the electronic paper display apparatus 1 further includes a controller 50 connected to the first, electrode 11. As used herein, the controller 50 may be part of or include an application specific integrated circuit (ASIC); an electronic circuit; a combinational logic circuit: a field programmable gate array (FPGA); a processor (shared, dedicated, or group) that executes code; other suitable hardware components that provide the described functionality; or a combination of some or all of the above, such as in a system-on-chip. The controller 50 may include non-transitory memory (shared, dedicated, or group) that stores code executed by the controller.

The term cods, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory in the display apparatus 1. The term group, as used above, means that some or all code from a single module may be executed using a group of processors. In addition, some or all code from a single module may be stored using a group of memories in the display apparatus 1.

Some embodiments of the present disclosure provide a method of driving the electronic paper display apparatus 1 to display images.

As shown in FIG. 2, the method includes providing a first pulse signal 01 to the first electrode 11 in a display stage of a first image display stage, which includes S100 and S200. The method may be performed by the controller 50 in the display apparatus.

Figure 3:
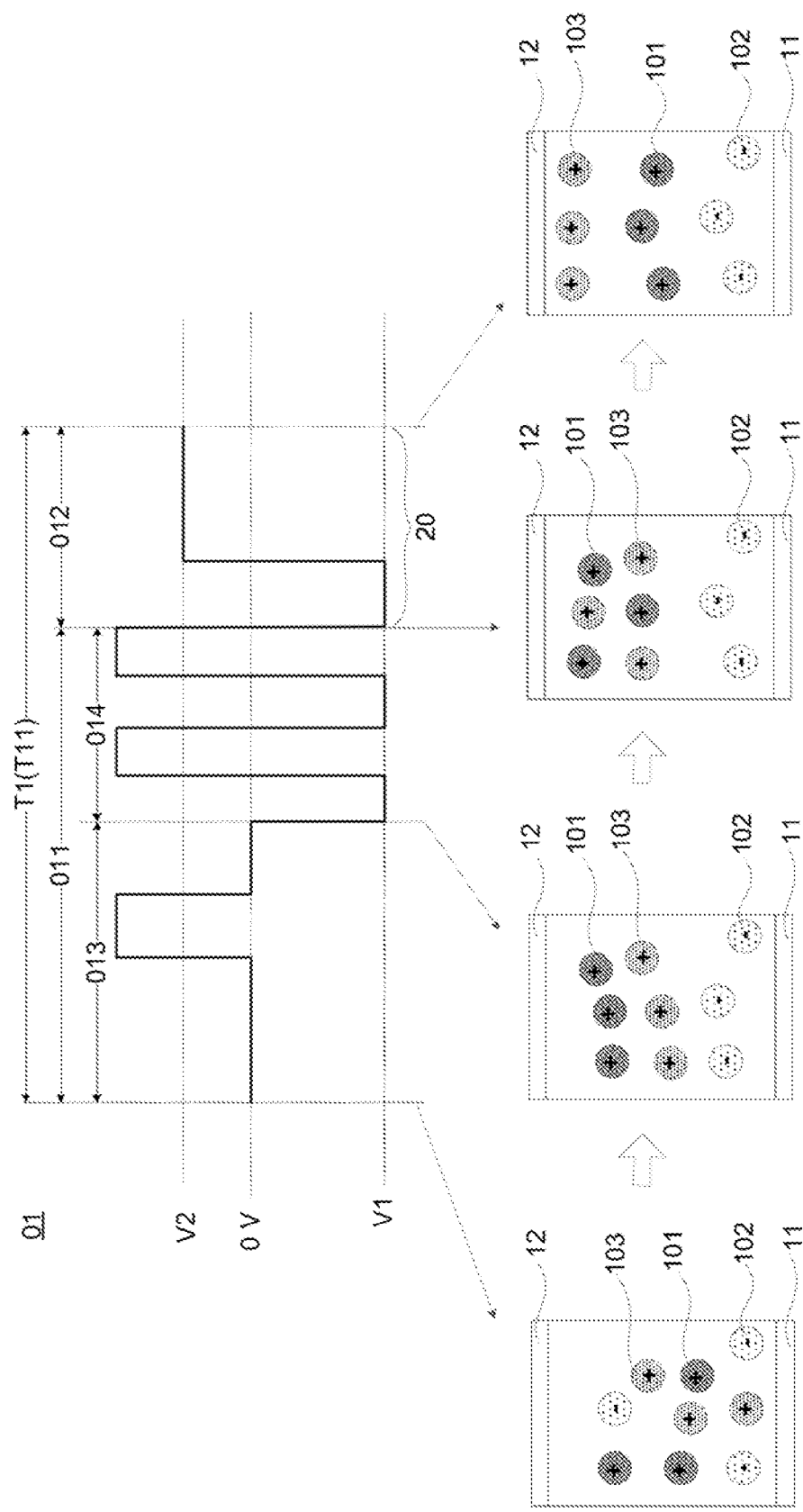
FIG. 3 is a waveform diagram of a first pulse signal, according to some embodiments.

In S100, as shown in FIG. 3, the controller 50 provides a preprocessing signal 011 in the first pulse signal 01 to the first electrode 11 in a display stage T1 of a first image display stage, so that the first particles 101 and the third particles 103 are mixed, and the first particles 101 and the third particles 103 are closer to a display side A of the electronic paper display apparatus 1 than the second particles 102.

In S200, as shown in FIG. 3, the controller 50 provides a first sub-pulse signal 012 in the first pulse signal 01 to the first electrode 11 of the microcup 10 in the display stage T1 after providing the preprocessing signal 011, so that the third particles 103 are closer to the display side A of the electronic paper display apparatus 1 than the first particles 101 and the second particles 102, and the microcup 10 displays the third color.

Herein, the first image display stage refers to an entire process of driving the electronic paper display apparatus 1 to display an image with the third color. The second image display stage described below refers to an entire process of driving the electronic paper display apparatus 1 to display an image with the first color, and the third image display stage described below refers to an entire process of driving the electronic paper display apparatus 1 to display an image with the second color. One or more frames may be displayed in each of the first, second and third image display stages.

Figure 7:
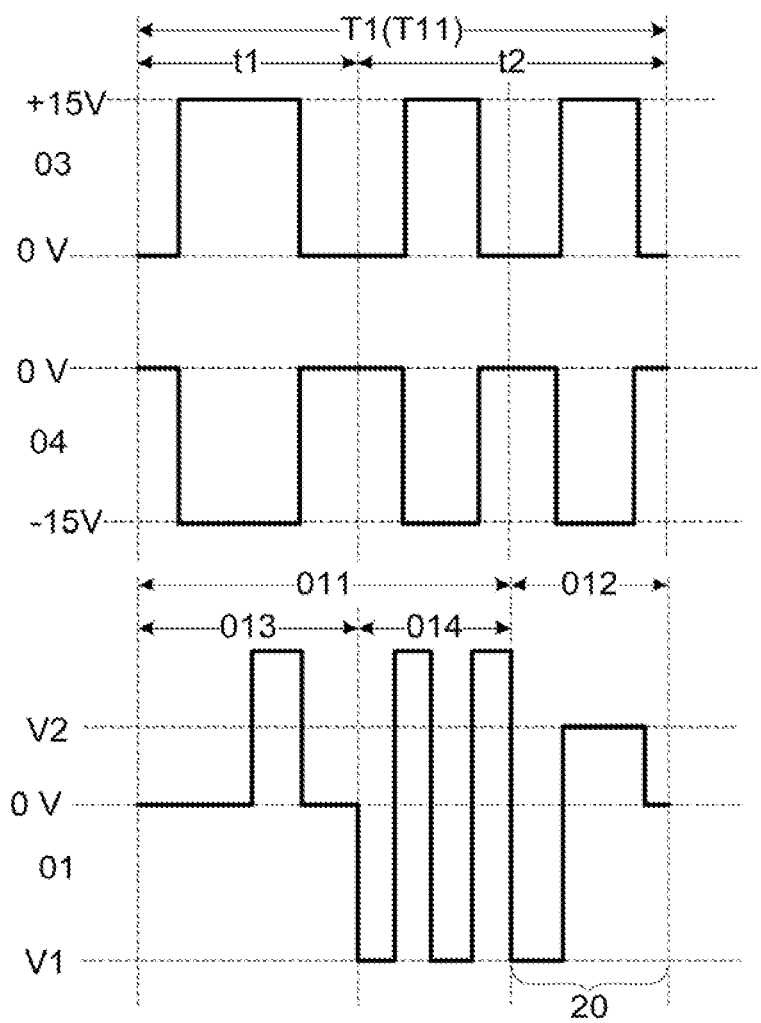
FIG. 7 is a waveform diagram of a first pulse :signal, a third pulse signal and a fourth pulse signal, according to some embodiments.
Figure 8:
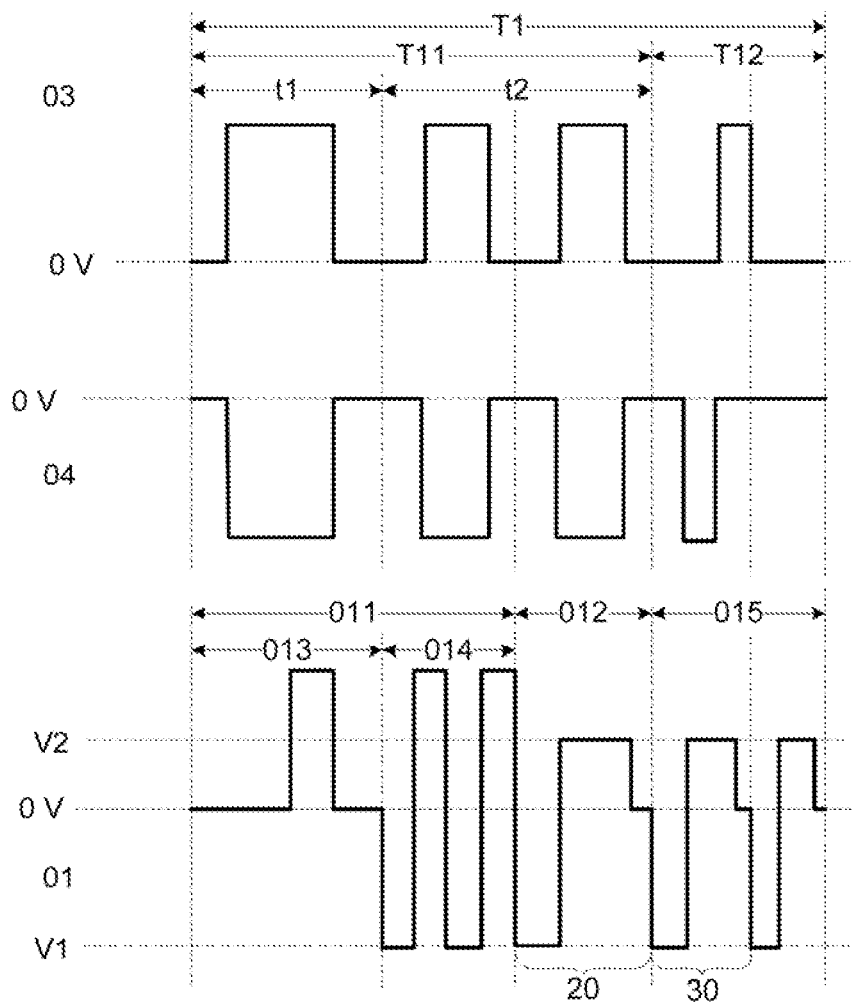
FIG. 8 is another waveform diagram of a first pulse signal, a third pulse signal and a fourth pulse signal, according, to some embodiments.

It will be noted that, as shown in FIG. 8, the first, second and third image display stages have the same stage division, and for ease of description, in FIGS. 7 to 10, the first, second and third image display stages are shown as a same stage, but they are actually different stages. In addition, in the embodiments below, the first image display stage corresponds to the first pulse signal and the second pulse signal, the second image display stage corresponds to the third pulse signal, and the third image display stage corresponds to the fourth pulse signal. For ease of description the image display stages in some descriptions are not mentioned but they can be distinguished according to their respective pulse signals.

It will be noted that, in a case where the microcup 10 displays the third color, the controller may provide the first pulse signal 01 to the first electrode 11 in the normal temperature environment or the low temperature environment. That is, there is no need to detect the temperature. In this case, when the electronic paper display apparatus 1 needs to display the third color, only the first pulse signal 01 is applied to the first electrode 11 by the controller.

In the display stage T1, as shown in FIG. 3, when the controller 50 provides the preprocessing signal 011 to the first electrode 11, an electric field existing between the first electrode 11 and the second electrode 12 drives the first particles 101 and the third particles 103 to move towards the display side A of the electronic paper display apparatus 1, and drives the second particles 102 to move away from the display side A of the electronic paper display apparatus 1. The first particles 101 and the third particles 103 are mixed together. When the controller 50 provides the first sub-pulse signal 012 to the first electrode 11, the electric field existing between the first electrode 11 and the second electrode 12 in the microcup 10 drives the third particles 103 to move towards the display side A of the electronic paper display apparatus 1 and are closer to the display side than the first particles 101, and thus the microcup 10 displays the third color.

In the process of the microcup 10 displaying the third color, the controller 50 provides the preprocessing signal 011 to the first electrode 11 before providing the first sub-pulse signal 012. In this, case, the first particles 101 and the third particles 103 are mixed together, and the first particles 101 and the third particles 103 are closer to the display side A of the electronic paper display apparatus 1 than the second particles 102. Then, the controller 50 provides the first sub-pulse signal 012 to the first electrode 11, and the third particles 103 are easier to move towards the display side of the electronic paper display apparatus 1 than the first particles 101. In this way, it may be ensured that color mixing will not occur when the microcup 10 displays the third color, especially when the microcup 10 displays the third color at low temperature.

Herein, there is no limitation on the preprocessing signal 011, as long as under action of the preprocessing signal 011 sent by the controller, the first particles 101 and the third particles 103 in the microcup 10 are mixed together, and the first particles 101 and the third particles 103 are closer to the display side of the electronic paper display apparatus 1 than, the second particles 102.

In some embodiments, as shown in FIG. 3, the S100, in which the controller 50 provides the preprocessing signal 011 to the first electrode 11, includes the following steps. The controller 50 provides a second sub-pulse signal 013 to the first electrode 11, so that the first particles 101 are closer to the display side A than the third particles 103, and the third particles 103 are closer to the display side A than the second particles 102, an effective voltage of the second sub-pulse signal 013 is a positive voltage or a negative voltage; and the controller 50 provides a third sub-pulse signal 014 to the first electrode 11, so that the first particles 101 are separated from the second particles 102, and the first particles 101 and the third particles 103 are mixed. The third sub-pulse signal 014 is a pulse signal with alternating positive and negative voltages, and an absolute value of the positive voltage is equal to an absolute value of the negative voltage. A duty ratio of the third sub-pulse signal 014 is 0.5.

When the controller 50 provides the second sub-pulse signal 013 to the first electrode 11, because polarity of the effective voltage of the second sub-pulse signal 013 is fixed (for example, as shown in FIG. 3, the effective voltage of the second sub-pulse signal 013 is a positive voltage), the first particles 101 and the third particles 103 are closer to the display side of the electronic paper display apparatus 1 than the second particles 102. In this case, since the mobility of the first particles 101 is greater than the mobility of the third particles 103, the moving speed of the first particles 101 is greater than the moving speed of the third particles 103 under action of the electric field existing between the first electrode 11 and the second electrode 12, and the first particles 101 are closer to the display side A of the electronic paper display apparatus 1 than the third particles 103.

However, the effective voltage of the second sub-pulse signal 013 is not maintained to the end of the second sub-pulse signal 013, that is, as shown in FIG. 3, a zero voltage is applied for a period of time after the effective voltage is applied to the first electrode 11, and the zero voltage may affect a separation state of the first particles 101 and the second particles 102 (i.e., the first particles 101 are closer to the display side and the second particles 102 are further away from the display side). In this case, when the third sub-pulse signal 014 is provided to the first electrode 11, since the charge polarity of the first particles 101 is opposite to the charge polarity of the second particles 102 the first particles 101 and the second particles 102 may be sufficiently separated. Since the charge polarity of the first particles 101 is the same as the charge polarity of the third particles 103, the first particles 101 and the third particles 103 may be mixed together.

The effective voltage of the second sub-pulse signal 013 may be a positive voltage or a negative voltage, as long as after the second sub-pulse signal 013 is provided to the first electrode 11, the electric field existing between the first electrode 11 and the second electrode 12 is able to drive the first particles 101 and the third particles 103 to move towards the display side, and to drive the second particles 102 to move away from the display side. In this case, an absolute value of the effective voltage of the second sub-pulse signal 013 is set in a way that the electric field existing between the first electrode 11 and the second electrode 12 enables the first particles 101 to be closer to the display side than the third particles 103.

Several possible implementations of the effective voltage of the second sub-pulse signal 013 are provided below.

In a first implementation, as shown in FIG. 1A, the second electrode 12 is closer to the display side A than the first electrode 11, the third particles 103 are positively charged, and the effective voltage of the second sub-pulse signal 013 is a positive voltage.

In a second implementation, the second electrode 12 is closer to the display side A than the first electrode 11, the third particles 103 are negatively charged, and the effective voltage of the second sub-pulse signal 013 is a negative voltage.

In a third implementation, the first electrode 11 is closer to the display side A than the second electrode 12, the third particles 103 are positively charged, and the effective voltage of the second sub-pulse signal 013 is a negative voltage.

In a fourth implementation, the first electrode 11 is closer to the display side A than the second electrode 12, the third particles 103 are negatively charged, and the effective voltage of the second sub-pulse signal 013 is a positive voltage.

Pulse signals in FIGS. 3 to 10 provided, to the first electrode 11 are shown by taking an example in which the second electrode 12 is closer to the display side A than the first electrode 11 and the third particles 103 are positively charged.

In some embodiments as shown in FIG. 3, the absolute value of the effective voltage of the second sub-pulse signal 013 is equal to a positive voltage of the third sub-pulse signal 014. Since the effective voltage of the second sub-pulse signal 013 may enable the, first particles 101 to be closer to the display side of the electronic paper display apparatus 1 than the third particles 103, the first particles 101 are more sufficiently separated from the second particles 102 when driven by the positive voltage of the third sub-pulse signal 014 that is equal to the absolute value of the effective voltage of the second sub-pulse signal 013.

Optionally, as shown in FIG. 3, the first sub-pulse signal 012 includes at least one first pulse unit 20. Each first pulse unit 20 includes a first voltage V1 and a second voltage V2 that are sequentially applied to the first electrode 11. A duration of the first voltage V1 in the first pulse unit 20 is less than a duration of the second voltage V2 in the first pulse unit 20. Polarity of the first voltage V1 in the first pulse unit 20 is opposite to the polarity of the effective voltage in the second sub-pulse signal 013. Polarity of the second voltage V2 in the first pulse unit 20 is the same as the polarity of the effective voltage of the second sub-pulse signal 013. An absolute value of the second voltage V2 in the first pulse unit 20 is less than the absolute value of the effective voltage of the second sub-pulse signal 013. In this case, the S200, in which the controller provides the first sub-pulse signal 012 in the first, pulse signal 01 to the first electrode 11 in the display stage T1, includes: providing continuously and sequentially, by the controller, the first voltage and the second voltage included in the first pulse unit to the first electrode 11 at least once in the display stage T1.

The duration of the first voltage V1 in the first pulse unit 20 refers to a time during which the first voltage V1 in the first pulse unit 20 is continuously applied to the first electrode 11. The duration of the second voltage V2 in the first pulse unit 20 refers to a time during which the second voltage V2 in the first pulse unit 20 is continuously applied to the first electrode 11.

Herein, that "the first sub-pulse signal 012 includes at least one first pulse unit 20" means, that the first sub-pulse signal 012 may include only one first pulse unit 20 or the first sub-pulse signal 012 may include two or more first pulse units 20. FIG. 3 only shows an example in which the first sub-pulse signal 012 includes one first pulse unit 20.

Since the polarity of the first voltage V1 in the first pulse unit 20 is opposite to the polarity of the effective voltage, of the second sub-pulse signal 013, when the first voltage V1 in the first pulse unit 20 is applied to the first electrode 11, the second particles 102 move towards the display side A, and the first particles 101 and the third particles 103 move away from the display side A. In this case, since the moving speed of the first particles 101 is greater than the moving speed of the third particles 103, after the first voltage V1 in the first pulse unit 20 is applied, the first particles 101 are farther away from the display side A than the third particles 103, and the third particles 103 are closer to the display side A than the first particles 101. Then, when the second voltage V2 in the first pulse unit 20 is applied to the first electrode 11, since the polarity of the second voltage V2 in the first pulse unit 20 is the same as the polarity of the effective voltage of the second sub-pulse signal 013, the third particles 103 move to the display side A earlier than the first particles 101, so that the microcup 10 displays the third color.

The absolute value of the second voltage V2 in the first pulse unit 20 is less than the absolute value of the effective voltage of the second sub-pulse signal 013, which may prevent the first particles 103 from moving too fast and causing the first particles 101 and the third particles 103 to mix.

In a case where the first particles 101 and the third particles 103 are determinate, the mobility of the first particles 101 and the mobility of the third particles 103 are also determinate. The mobility of the first particles 101 may be greater than the mobility of the third particles 103. In a first electric field generated by applying the first voltage V1, the first particles 101 and the third particles 103 move away from the display side A, and the first particles 101 will reach the opposite side of the display side A earlier than the third particles 103. Then, in a second electric field (which is opposite to the direction of the first electric field) generated by applying the second voltage V2, the first particles 101 and the third particles 103 move towards the display side, distances from the first particles 101 to the display side are greater than distances from third particles 103 to the display side, and thus the first particle 101 does not necessarily reach the display side before the third particles 103. In this case, the second voltage V2 in the first sub-pulse signal 012 may be determined by experimental means, when the determined second voltage V2 in the first sub-pulse signal 012 is applied to the first electrode 11, the third particle 103 move to a position closer to the display side than the first particle 101.

In some examples, the effective voltage in the second sub-pulse signal 013 is +15 V, the first voltage V1 in the first sub-pulse signal 012 is −15 V, and the second voltage V2 in the, first sub-pulse signal 012 is any value between +5 V and +10 V, such as +5 V, +6 V, +7 V, +8 V, +9 V, or +10 V.

Figure 5:
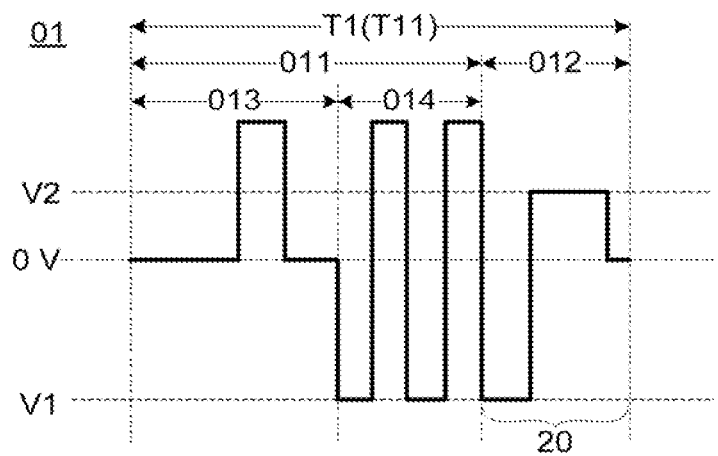
FIG. 5 is a waveform diagram of another first pulse signal, according to some embodiments.

Since the charge polarity of the first particles 101 is the same as the charge polarity of the third particles 103, if the second voltage V2 in the first pulse unit 20 is applied for a long time, the first particles 101 will approach the display side so that a ghost of the first color may occur when the microcup 10 displays the third color, thereby affecting a display effect of the microcup 10. In this case, optionally, as shown in FIG. 5, the first pulse unit 20 further includes a zero voltage following the second voltage V2 in the first pulse unit 20.

In this case, after the controller provides the second voltage V2 in the first pulse unit 20 to the first electrode 11, the S200, in which the controller provides the first sub-pulse signal 012 to the first electrode 11, further includes: providing, by the controller, a zero voltage included in the first pulse unit 20 to the first electrode 11.

In some examples, a duration of the zero voltage in the first pulse unit 20 is less than the duration of the first voltage V1 in the first pulse unit 20. The duration of the zero voltage in the first, pulse unit 20 refers to a time during which, the zero voltage in the first pulse unit 20 is continuously applied to the first electrode 11. Embodiments of the present disclosure are not limited thereto, and the duration of the zero voltage following the second voltage V2 in the first pulse unit 20 may be set as needed.

During applying the second voltage V2 in the first pulse unit 20, both the third particles 103 and the first particles 101 move toward the display side of the electronic paper display apparatus 1. In this case. the controller stops applying the second voltage V2 in the first pulse unit 20 to the first electrode 11 in time, and then applies the zero voltage in the first pulse unit 20 to the first electrode 11 for a period of time, so that both the third particles 103 and the first particles 101 move toward the display side, of the microcup 10 for a period of time due to inertia. However, distances from the first particles 101 to the display side is greater than distances from the third particles 103 to the display side after the second voltage V2 is applied, although the first particles 101 move toward the display side of the microcup 10 due to inertia, a power caused by the inertia is significantly less than a power provided by the second voltage V2 in the first pulse unit 20, and thus the power caused by the inertia is insufficient to make the first particles 101 overtake the third particles 103 to reach the display side. In this way, it may be ensured that the microcup 10 only displays the third color.

Figure 6:
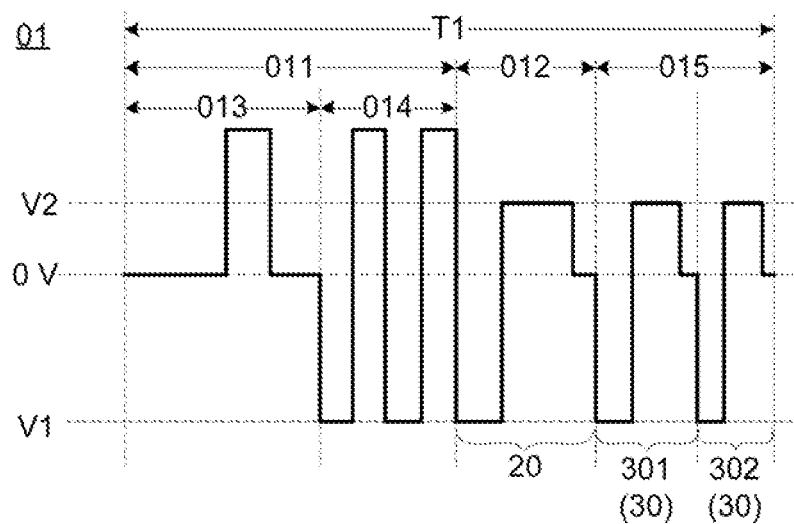
FIG. 6 is a waveform diagram of yet another first pulse signal, according to some embodiments.

Optionally, as shown in FIG. 6, the first pulse signal 01 further includes a fourth sub-pulse signal 015 provided to the first electrode 11 in the display stage T1 of the first image display stage, and the fourth sub-pulse signal 015 follows the first sub-pulse signal 012. In this case, the method further includes: providing (i,e., S300), by the controller, the fourth sub-pulse signal 015 to the first electrode 11 in the display stage T1 after the controller provides (i.e., S200) the first sub-pulse signal 012 to the first electrode 11.

As shown in FIG, 6, the fourth sub-pulse signal 015 includes a plurality of second pulse units 30. Each second pulse unit 30 includes the first voltage V1 the second voltage V2 and the zero voltage that are sequentially applied to the first electrode 11. The duration of the first voltage V1 is less than the duration of the second voltage V2. The durations of the first voltages V1 in the plurality of second pulse units 30 are gradually reduced in an order in which the plurality of second pulse units 30 are applied to the first electrode 11. The durations of the second voltages V2 in the plurality of second pulse units 30 are gradually reduced in this order. The durations of the zero voltages in the plurality of second pulse units 30 are gradually reduced in this order. Since the plurality of second pulse units 30 are sequentially applied to the first electrode; 11, the plurality of second pulse units 30 have a time sequence,.

For example, as shown in FIG. 6, the second pulse unit 302 follows the second pulse unit 301. The duration of the first voltage V1 in the second pulse unit 302 is less than the duration of the first voltage V1 in the second pulse unit 301, the duration of the second voltage V2 in the second pulse unit 302 is less than the duration of the second voltage V2 in the second pulse unit 301, and the duration of the zero voltage in the second pulse unit 302 is less than the duration of the zero voltage in the second pulse unit 301.

The first pulse unit 20 in the first sub-pulse signal 012 includes the first voltage V1, the second voltage V2 and the zero voltage that are sequentially applied, and the second pulse unit 30 in the fourth sub-pulse signal 015 also includes the first voltage V1, the second voltage V2 and the zero voltage that are sequentially applied. In this case, the waveform of the first pulse unit 20 and the waveform of the second pulse unit 30 are similar, but, the period of the first pulse unit 20 is different from the period of the second pulse unit 30. According to the above description of the first, sub-pulse signal 012, it will be known that the first pulse unit 20 in the first sub-pulse signal 012 enables the third particles 103 to be closer to the display side than the first particles 101 and the second particles 102. Similarly, the second pulse unit 30 in the fourth sub-pulse signal 015 also enables the third particles 103 to be closer to the display side than the first particles 101 and the second particles 102, which will not be described herein again.

After the first sub-pulse signal 012 is provided to the first electrode 11, if no voltage is applied to the first electrode 11 for a long time, positions of the first particles 101, the second particles 102 and the third particles 103 in the microcup 10 will change, and a state where the third particles 103 is closer to the display side than the first particles 101 and the second particles 102 may not be maintained. As a result, when the microcup 10 displays the third color, the ghost may occur, which may affect the display effect of the electronic paper display apparatus 1. However, in the embodiments, the controller 50 provides the first sub-pulse signal 012 to the first electrode 11, and then provides the fourth sub-pulse signal 015 to the first electrode 11, so that the first particles 101, the second particles 102 and the third particles 103 in the microcup 10 may maintain the state where the third particles 103 are closer to the display side than the first particles 101 and the second particles 102. As a result, on the one hand the microcup 10 may still display the third color, and on the other hand, the third color displayed by the microcup 10 may be complemented, thereby improving the display effect of the electronic paper display, apparatus 1.

Figure 11:
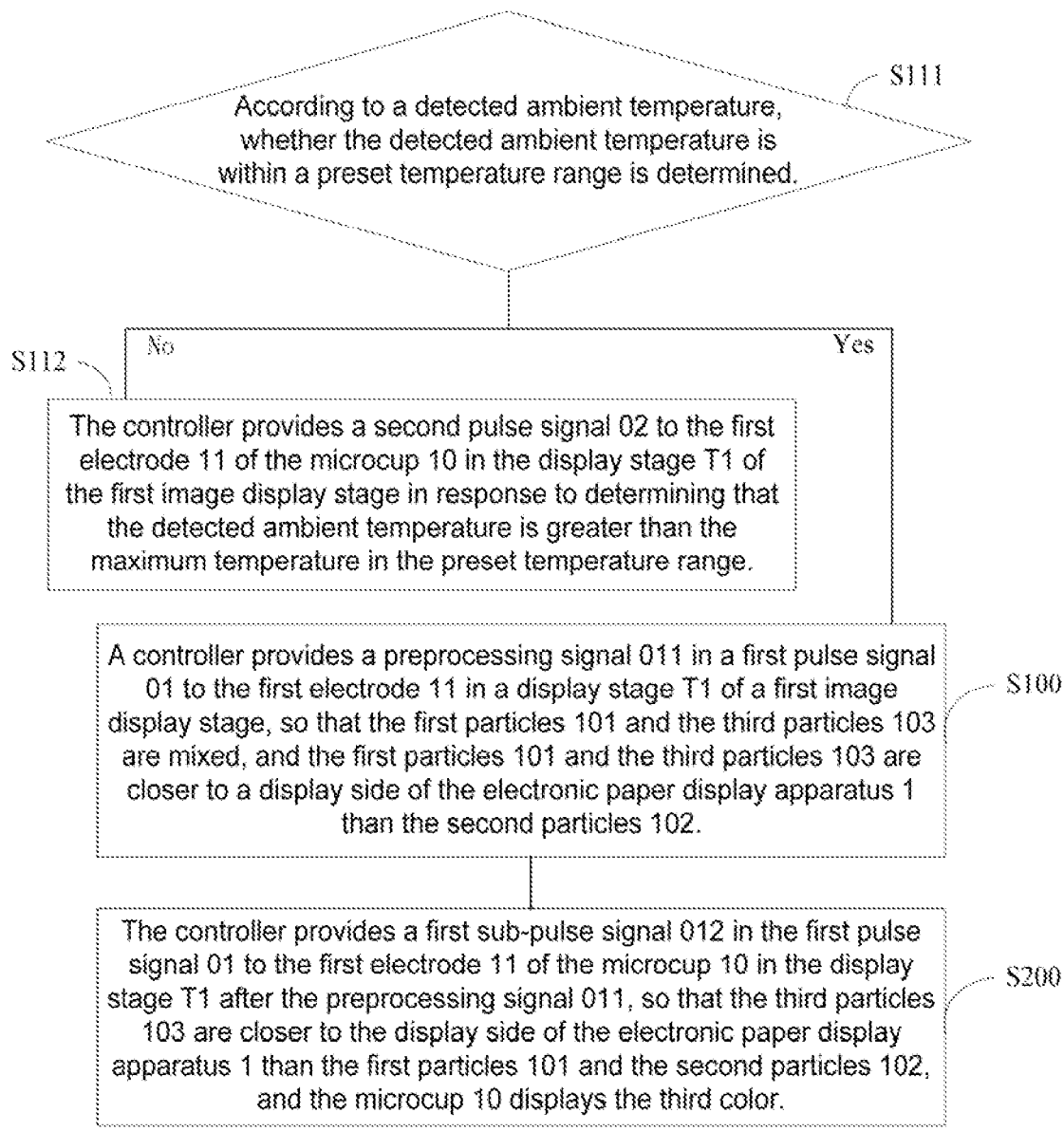
FIG. 11 is a flow diagram of another method of driving an electronic paper display apparatus, according to some embodiments.

Optionally, as shown in FIG. 11 before providing the first pulse signal 01 to the first electrode 11 the method of driving the electronic paper display apparatus 1 further includes S111.

In S111, the controller 50 receives a detected ambient temperature and determines whether the detected ambient temperature is within a preset temperature range.

Figure 21:
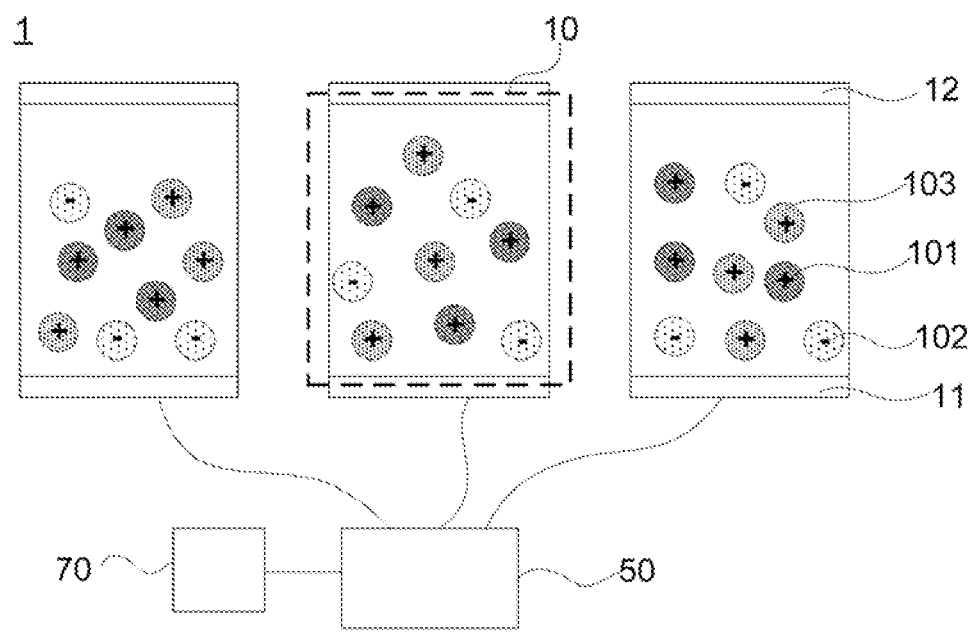
FIG. 21 is a schematic structural diagram of yet another electronic paper display apparatus, according to some embodiments.

In some embodiments, as shown in FIG. 21, the electronic paper display apparatus 1 further includes a temperature sensor 70. Herein, the temperature sensor 70 is configured to detect the ambient temperature.

The controller 50 performs the S100, i.e., provides the first pulse signal 01 to the first electrode 11, in response to determining that the detected ambient temperature is within the preset temperature range.

Herein, the preset temperature range is used to measure whether the microcup 10 is in the low temperature environment. In some embodiments, the preset temperature range is from 0° C. to 10° C.

In the low temperature environment i.e., within the preset temperature range), the first pulse signal 01 is provided to the first electrode 11, so that the electric field existing between the first electrode 11 and the second electrode 12 drives the third particles 103 to be closer to the display side than the first particles 101 and the second particles 102. In this way, it may be ensured that no color mixing occurs when the third color is displayed in the low temperature environment.

Optionally, as shown in FIG. 11, the method of driving the electronic paper display apparatus 1 further includes S112.

Figure 4:
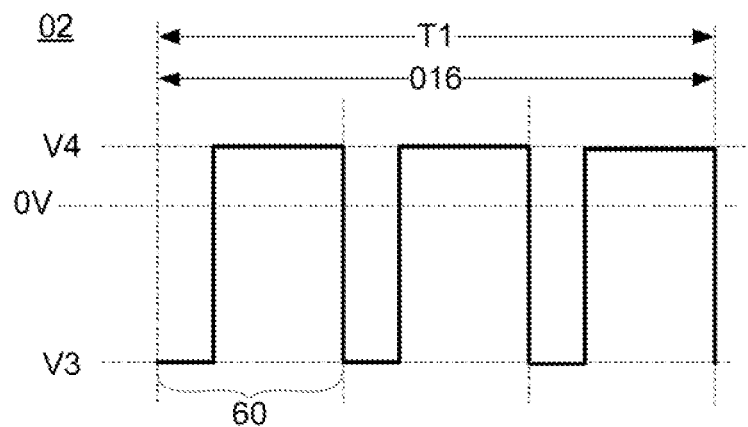
FIG. 4 is a waveform diagram of a second pulse signal, according to some embodiments.

In S112, as shown in FIG. 4, the controller 50 provides a second pulse signal 02 to the first electrode 11 in the display stage T1 of the first image display stage in response to determining that the detected ambient temperature is greater than the maximum temperature in the preset temperature range, for example, greater than 10° C.

As shown in FIG. 4, the second pulse signal 02 includes a sixth sub-pulse signal 016 applied to the first electrode 11 in the display stage T1 of the first image display stage. The sixth sub-pulse signal 016 includes at least one third pulse unit 60. Each third pulse unit 60 includes a third voltage V3 and a fourth voltage V4 that are sequentially applied to the first electrode 11. A duration of the third voltage V3 is less than a duration of the fourth voltage V4, Polarity and a value of the third voltage V3 in the third pulse unit 60 are the same as the polarity and the value of the first voltage V1 in the first sub-pulse signal 012, and polarity of the fourth voltage V4 in the third pulse unit 60 is the same as the polarity of the second voltage V2 in the first sub-pulse signal 012. An absolute value of the fourth voltage V4 is less than or equal to the absolute value of the second voltage V2 in the first sub-pulse signal 012. That is, a waveform of the sixth sub-pulse signal 016 is similar to a waveform of the first sub-pulse signal 012 without the zero voltage, except that the absolute value of the fourth voltage V4 in the sixth sub-pulse signal 016 is less than the absolute value of the second voltage V2 in the first sub-pulse signal 012.

The mobility of the first particles 101, the mobility of the second particles 102 and the mobility of the third particles 103 decrease as the temperature decreases. When the temperature decreases from the normal temperature to the low temperature, the reduction in mobility of the third particles 103 may be greater than the reduction in mobility of the first particles 101. In this case, in the low temperature environment, if the sixth sub-pulse signal 016 is provided to the first electrode 11 in the display stage T1, the third particles 103 may fail to move to a position closer to the display side of the electronic paper display apparatus than the first particles 101. Therefore, the first particles 101 and the third particles 103 may mix together, and color mixing may occur when the microcup 10 displays the third color. In a case where the ambient temperature is greater than the maximum temperature in the preset temperature range, the mobility of the third particles 103 and the mobility of the first particles 101 are both large, and the mobility of the first particles 101 is greater than the mobility of the third particles 103. Therefore, when the second pulse signal 02 is provided to the first electrode 11, the third particles 103 are closer to the display side than the first particles 101 and the second particles 102.

In this case, if the ambient temperature is greater than the maximum temperature in the preset temperature range, since the mobility of the third particles 103 at the ambient temperature is greater than the mobility thereof in the preset temperature range, when the second pulse signal 02 is provided to the first electrode 11 to drive the third particles 103 to be closer to the display side than the first particles 101 and the second particles 102, the fourth voltage V4 in the second pulse signal 02 may be set to be less than the second voltage V2 in the first pulse signal 01. In some examples, in the second pulse signal 02, the third voltage V3 is −15 V and the fourth voltage V4 is +5 V.

Optionally, as shown in FIG. 12, the method of driving the electronic paper display apparatus 1 further includes S400 and S500.

In S400, as shown in FIG. 7, the controller 50 provides a third pulse signal 03 to the first electrode 11 in the display stage T1, so that the first particles 101 are closer to the display side of the electronic paper display apparatus 1 than the second particles 102 and the third particles 103, and the, microcup 10 displays the first color.

In S600, as shown in FIG, 7, the controller 50 provides a fourth pulse signal 04 to the first electrode 11 in the display stage T1, so that the second particles 102 are closer to the display side of the electronic paper display apparatus 1 than the first particles 101 and the third particles 103, and the microcup 10 displays the second color.

When the third pulse signal 03 is provided to the first electrode 11 since the charge polarity of the first particles 101 is the same as the charge polarity of the third particles 103, by controlling the electric field existing between the first electrode 11 and the second electrode 12, the first particles 101 and the third particles 103 are driven to move towards the display side of the electronic paper display apparatus 1, and simultaneously the second particles 102 are driven to move away from the display side of the electronic paper display apparatus 1. Since the mobility of the first particles 101 is greater than the mobility of the third particles 103, the first particles 101 are closer to the display side of the electronic paper display apparatus 1 than the third particles 103, so that the microcup 10 displays the first color.

When the, fourth pulse signal 04 is provided to the first electrode 11 since the charge polarity of the second particles 102 is opposite to the charge polarity of the first particles 101 and the charge polarity of the third particles 103, by controlling the electric field existing between the first electrode 11 and the second electrode 12, the second particles 102 are driven to move towards the display side of the electronic paper display apparatus 1, and simultaneously the first particles 101 and the third particles 103 are driven to move away from the display side of the electronic paper display apparatus 1. so that the microcup 10 displays the second color.

Optionally, as shown in FIG. 8, the display stage T1 includes a first display stage T11, and the first display stage T11 corresponds to the first pulse signal 01 including the preprocessing signal 011 and the first sub--pulse signal 012. The first display stage T11 includes a first sub-display stage t1 and a second sub-display stage t2, and the first sub-display stage t1 precedes the second sub-display stage t2.

In this case, the S100 and the S200 include: providing, by the controller 50, the second sub-pulse signal 013 to the first electrode 11 in the first sub-display stage t1 of the first display stage T11; and providing by the controller 50, the third sub-pulse signal 014 and the first, sub-pulse signal 012 continuously to the first electrode 11 in a second sub-display stage t2 of the first display stage T11.

In some embodiments, an effective voltage of the third pulse signal 03 in the display stage T1 is a positive voltage or a negative voltage, and polarity of the effective voltage of the third pulse signal 03 in the display stage T1 is the same as the polarity of the effective voltage of the second sub-pulse signal 013 in the first pulse signal 01. For example, as shown in FIGS. 6 and 7, both the effective voltage of the third pulse signal 03 and the effective voltage of the second sub-pulse signal 013 are positive voltages.

The third pulse signal 03 includes a plurality of third pulses. A pulse width of any third pulse in the first sub-display stage t1 is greater than a pulse width of any third pulse in the second sub-display stage t2, A pulse width of each third pulse in the first sub-display stage t1 is the same, and a pulse width of each third pulse in the second sub-display stage t2 is the same.

The pulse width refers to the elapsed time between the rising and falling edges of a pulse, and also refers to time duration of a pulse in the pulse signal.

In some embodiments, an effective voltage of the fourth pulse signal 04 in the display stage T1 is a positive voltage or a negative voltage, and an polarity of the effective voltage of the fourth pulse signal 04 in the display stage T1 is opposite to the polarity of the effective voltage of the second sub-pulse signal 013 in the first pulse signal 01. For example, as shown in FIGS. 6 and 7, the effective voltage of the fourth pulse signal 04 in the display stage T1 is a negative voltage, and the effective voltage of the second sub-pulse signal 013 is a positive voltage.

The fourth pulse signal 04 includes a plurality of fourth pulses. A pulse width of any fourth pulse in the first sub-display stage t1 is greater than a pulse width of any fourth pulse in the second sub-display stage t2. A pulse width of each fourth pulse in the first sub-display stage t1 is the same, and a pulse width of each fourth pulse in the second sub-display stage t2 is the same.

Herein, as shown in FIG. 7, the effective voltage of the third pulse signal 03 in the display stage T1 is a positive voltage, and the effective voltage of the fourth pulse signal 04 in the display stage T1 is a negative voltage. Or, the effective voltage of the third pulse signal 03 in the display stage T1 is a negative voltage, and the effective voltage of the fourth pulse signal 04 in the display stage T1 is a positive voltage. However, it will be understood that, both the polarity of the effective voltage of the third pulse signal 03 and the polarity of the effective, voltage of the fourth pulse signal 04 are related to the polarity of the effective voltage of the second sub-pulse signal 013 in the first pulse signal 01.

In a case where the second electrode 12 is closer to the display side than the first electrode 11, the effective voltage of the third pulse signal 03 and the effective voltage of the fourth pulse signal 04 are set as follows. In a case where the first particles 101 are positively charged and the second particles 102 are negatively charged, the effective voltage of the third pulse signal 03 in the display stage T1 is a positive voltage, and the effective voltage of the fourth pulse signal 04 in the display stage T1 is a negative voltage. In a case where the first particles 101 are negatively charged and the second particles 102 are positively charged, the effective voltage of the third pulse signal 03 in the display stage T1 is a negative voltage, and the effective voltage of the fourth, pulse signal 04 in the display stage T1 is a positive voltage.

In a case where the first electrode 11 is closer to the display side than the first electrode 12, the effective voltage of the third pulse signal 03 and the effective voltage of the fourth pulse signal 04 are set as follows. In a case where the first particles 101 are positively charged and the second particles 102 are negatively charged, the effective voltage of the third pulse signal 03 in the display stage T1 is a negative voltage, and the effective voltage of the fourth pulse signal 04 in the display stage T1 is a positive voltage. In a case where the first particles 101 are negatively charged and the second particles 102 are positively charged, the effective voltage of the third pulse signal 03 in the display stage T1 is a positive voltage, and the effective voltage of the fourth pulse signal 04 in the display stage T1 is a negative voltage.

In some examples, as shown in FIG. 7, the effective voltage of the third pulse signal 03 in the display stage T1 is +15 V, and the effective voltage of the fourth pulse signal 04 in the display stage T1 is −15 V. Of course, in the display stage T1, the effective voltage of the third pulse signal 03 and the effective voltage of the fourth pulse signal 04 are not limited thereto, and may also be other voltage values.

In the first sub-display stage t1, since the pulse width of the third pulse in the third, pulse signal 03 and the pulse width of the fourth pulse in the fourth pulse signal 04 are large, in the first sub-display stage t1, the first particles 101 may rapidly move to the display side A when the third pulse signal 03 is provided to the first electrode 11, and the second particles 102 may rapidly move to the display side A when the fourth pulse signal 04 is provided to the first electrode 11.

After the first particles 101 or the second particles 102 in the microcup 10 have moved to a position close to the display side in the first sub-display stage t1, in order to maintain the state of the first particles 101 or the second particles 102 in the first sub-display stage t1, the third pulse signal 03 or the fourth pulse signal 04 is provided to the first electrode 11. In addition, the pulse width of the third pulse in the third pulse signal 03 and the pulse width of the fourth pulse in the fourth pulse signal 04 in the second sub-display stage t2 may be set small, so that power consumption may be reduced.

Optionally, the display stage T1 further includes a second display stage T12 following the first display stage T11, and the fourth sub-pulse signal 015 in the first pulse signal 01 is in the second display stage T12.

In some embodiments, as shown in FIG. 8, a pulse width of any third pulse of the third pulse signal 03 in the second display stage T12 is less than a pulse width of any third pulse in the first display stage T11. A pulse width of any fourth pulse in the fourth pulse signal 04 in the second display stage T12 is less than a pulse width of any fourth pulse in the first display stage T11.

After the first display stage T11, if no voltage is applied to the first electrode 11 for a long time, positions of the first particles 101 the second particles 102 and the third particles 103 in the microcup 10 will change, and the state in the first display stage T11 may not be maintained in the second display stage T12, Therefore, the ghost may occur when the microcup 10 displays the first color or the second color, which may affect the display effect of the electronic paper display apparatus 1.

Therefore, in the embodiments of the present disclosure, when the microcup 10 displays the first color, the third pulse signal 03 is provided in the second display stage T12, on the, one hand, the state of the first particles 101, the second particles 102 and the third particles 103 in the microcup 10 in the first display stage T11 may be still maintained, so, that the microcup 10 displays the first color in the second display stage T12; on the other hand, the first particles 101 may be made closer to the display side for the color complements when the electronic paper display apparatus 1 displays the first color, thereby improving the display effect of the electronic paper display apparatus 1.

Similarly, when the microcup 10 displays the second color, by applying the fourth pulse signal 04 in the, second display stage T12, on the one hand, the state of the first particles 101, the second particles 102 and the third particles 103 in the microcup 10 in the first display stage T11 may be still maintained, so that the microcup 10 displays the second color in the second display stage T12; on the other hand the second particles 102 may be made closer to the display side the color complements when the electronic paper display apparatus 1 displays the second color, thereby improving the display effect of the electronic paper display apparatus 1.

Figure 9:
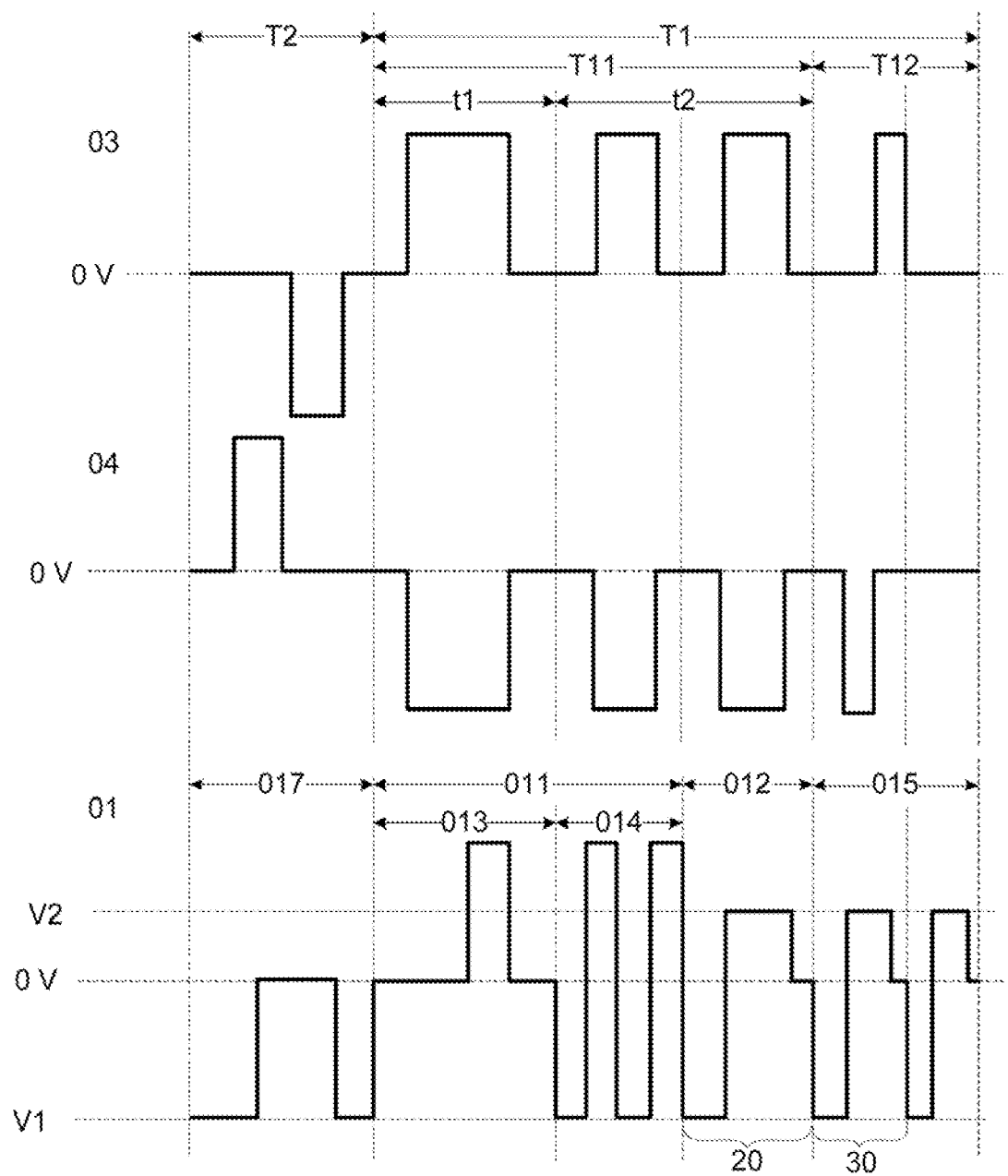
FIG. 9 is yet another waveform diagram, of a first pulse signal, third pulse signal and a fourth pulse signal, according to some embodiments.

Optionally, as shown in FIG. 9, each of the first, second and third image display stages further includes a balance stage T2 in addition to the display stage T1, and the balance stage T2 precedes the display stage T1.

As shown in FIG. 9, the first pulse signal 01 further includes a fifth sub-pulse signal 017 provided to the first electrode 11 in the balance stage T2. In this case, before the display stage, the method further includes: providing, by the controller 50, the fifth sub-pulse signal 017 to the first electrode 11 in the balance stage T2 of the first image display stage.

Polarity of an effective voltage of the fifth sub-pulse signal 017 is the same as the polarity of the first voltage V1 in the first sub-pulse signal 012. A product of an absolute value of the effective voltage in the fifth sub-pulse signal 017 and a total time of the effective voltage in the fifth sub-pulse signal 017 is defined as a first value. In the first and fourth sub-pulse signals 012, 015, a product of an absolute value of the first voltage V1 and a total time of the first voltage V1 applied to the first electrode 11 is defined as a second value. In the first and fourth sub-pulse signals 012, 015, a product of an absolute value of the second voltage V2 and a total time of the second voltage V2 applied to the first electrode 11 is defined as a third value. The first value is equal to an absolute value of a difference between the second value and the third value.

In a case where the first voltage V1 is a positive voltage, the effective voltage of the fifth sub-pulse signal 017 is a positive voltage. In a case where the first voltage V1 is a negative voltage, the effective voltage of the fifth sub-pulse signal 017 is a negative voltage.

Herein, the effective voltage of the fifth sub-pulse signal 017 may be equal to the first voltage V1, or not. FIG. 9 shows an example in which the effective voltage of the fifth sub pulse signal 017 is equal to the first voltage V1 in the first sub-pulse signal 012.

In some embodiments of the present disclosure, the balance stage T2 is added before the display stage T1, and the product of the absolute value of the effective voltage of the fifth sub-pulse signal 017 and the total time of the effective voltage applied to the first electrode 11 is made equal to the absolute value of the difference between the product of the absolute value of the first voltage V1 in both the first sub-pulse signal 012 and the fourth sub-pulse signal 015 and the total time of the first voltage V1 applied to the first electrode 11 in both the first sub-pulse signal 012 and the fourth sub-pulse signal 015 and the product of the absolute value of the second voltage V2 in both the first sub-pulse signal 012 and the fourth sub-pulse signal 015 and the total time of the second voltage V2 applied to the first electrode 11 in both the first sub-pulse signal 012 and the fourth sub-pulse signal 015. In this way, throughout the balance stage T2 and the display stage T1, when the microcup 10 displays the third color, the electric field existing between the first electrode 11 and the second electrode 12 tends to be balanced, which may avoid the built-in electric field generated by the first particles 101, the second particles 102 and the third particles 103 due to unbalance of the electric field between the first electrode 11 and the second electrode 12.

In some embodiments, the effective voltage of the fifth sub-pulse signal 017 is equal to the first voltage V1 in the first sub-pulse signal 012, and thus can be regarded as the first voltage V1. In this way, throughout the balance stage T2 and the display stage T1, a product of the absolute value of the first voltage V1 and the total time of the first voltage V1 applied to the first electrode 11 is made equal to a product of the absolute value of the second voltage V2 and the total time of the second voltage V2 applied to the first electrode 11, which may effectively avoid the built-in electric field generated by the first particles 101, the second particles 102 and the third particles 103 due to unbalance of the electric field between the first electrode 11 and the second electrode 12.

As shown in FIG. , when the third pulse signal 03 is provided to the first electrode 11, polarity of an effective voltage of the third pulse signal 03 in the balance stage T2 is opposite to the polarity of the effective voltage of the third pulse signal 03 in the display stage T1, and a product of an absolute value of the effective voltage of the third pulse signal 03 in the balance stage T2 and a total time of the effective voltage of the third pulse signal 03 applied to the first electrode 11 in the balance stage T2 is equal to a product of an absolute value of the effective voltage of the third pulse signal 03 in the display stage T1 and a total, time of the effective voltage of the third pulse signal 03 applied to the first electrode 11 in the display stage T1.

In a case where the effective voltage in the third pulse signal 03 in the display stage T1 is a positive voltage, the effective voltage in the third pulse signal 03 in the balance stage T2 is a negative voltage. In a case where the effective voltage in the third pulse signal 03 in the display stage T1 is a negative voltage, the effective voltage in the third pulse signal 03 in the balance stage T2 is a positive voltage.

The absolute value of the effective voltage in the third pulse signal 03 in the balance stage T2 may be equal to the absolute value of the effective voltage in the third pulse signal 03 in the display stage T1, or not. FIG. 9 shows an example in which the absolute value of the effective voltage in the third pulse signal 03 in the balance stage T2 is equal to the absolute value of the effective voltage, in the third pulse signal 03 in the display stage T1.

In the embodiments, the balance stage T2 is added before the display stage T1. In addition, a product of the absolute value of the effective voltage of the third pulse signal 03 in the balance stage T2 and the total time of the effective voltage of the third pulse signal 03 applied to the first electrode 11 in the balance stage T2 is equal to a product of the absolute value of the effective voltage of the third pulse signal 03 in the display stage T1 and the total time of the effective voltage of the third pulse signal 03 applied to the first electrode 11 in the display stage T1. In this way, throughout the balance stage T2 arid the display stage T1, in a case where the microcup 10 displays the first color, the electric field between the first electrode 11 and the second electrode 12 tends to be balanced, which may avoid the built-in electric field that is generated by the first particles 101, the second particles 102 and the third particles 103 due to unbalance of the electric field between the first electrode 11 and the second electrode 12.

In some embodiments, the absolute value of the effective voltage in the third pulse signal 03 in the balance stage T2 is equal to the absolute value of the effective voltage in the third pulse signal 03 in the, display stage T1. In this way, throughout the balance stage T2 and the display stage T1, the total time of the effective voltage in the third pulse signal 03 applied to the first electrode 11 in the balance stage T2 is made equal to the total time of the effective voltage in the third pulse signal 03 applied to the first electrode 11 in the display stage T1, which may effectively avoid the built-in electric field that is generated by the first particles 101, the second particles 102 and the third particles 103 due to unbalance of the electric field between the first electrode 11 and the second electrode 12.

As shown in FIG. 9, when the fourth pulse signal 04 is applied to the first electrode 11, polarity of an effective voltage of the fourth pulse signal 04 in the balance stage T2 is opposite to the polarity of the effective voltage of the fourth pulse signal 04 in the display stage T1. In addition, a product of an absolute value of the effective voltage in the fourth pulse signal 04 in the balance stage T2 and a total time of the effective voltage in the fourth pulse signal 04 applied to the first electrode 11 in the balance stage T2 is equal to a product of an absolute value of the effective voltage in the fourth pulse signal 04 in the display stage T1 and a total time of the effective voltage in the fourth pulse signal 04 applied to the first electrode 11 in the display stage T1.

In a case where the effective voltage in the fourth pulse signal 04 in the display stage T1 is a positive voltage, the effective voltage in the fourth pulse signal 04 in the balance stage T2 is a negative voltage. In a case where the effective voltage in the fourth pulse signal 04 in the display stage T1 is a negative voltage, the effective voltage in, the fourth pulse signal 04 in the balance stage T2 is a positive voltage.

The absolute value of the effective voltage in the fourth pulse signal 04 in the balance stage T2 may be equal to the absolute value of the effective voltage in the fourth pulse, signal 04 in the display stage T1, or not. FIG. 9 shows an example in which the absolute value of the effective voltage in the fourth pulse signal 04 in the balance stage T2 is equal to the absolute value of the effective voltage in the fourth pulse signal 04 in the display stage T1.

In the embodiments, the balance stage T2 is added before the display stage T1. In addition, the product of the absolute value of the effective voltage in the fourth pulse signal 04 in the balance stage T2 and the total time of the effective voltage in the fourth pulse signal 04 applied to the first electrode 11 in the balance stage T2 is equal to the product of the absolute value of the effective voltage in the fourth pulse signal 04 in the display stage T1 and the total time of the effective voltage in the fourth pulse signal 04 applied to the first electrode 11 in the display stage T1. In this way, throughout the balance stage T2 and the display stage T1, when the microcup 10 displays the second color, the electric field between the first electrode 11 and the second electrode 12 tends to be balanced, which may avoid the built-in electric field that is generated by the first particles 101, the second particles 102 and the third particles 103 due to unbalance of the electric field the first electrode 11 and the second electrode 12.

In some embodiments, the absolute value of the effective voltage in the fourth pulse signal 04 in the balance stage T2 is equal to the absolute value of the effective voltage in the fourth pulse signal 04 in the, display stage T1. In this way, throughout the balance stage T2 and the display stage T1, the total time of the effective voltage in the fourth pulse signal 04 applied to the first electrode 11 in the balance stage T2 is made equal to the total time of the effective voltage in the fourth pulse signal 04 applied to the first electrode 11 in the display stage T1, which may effectively avoid the built-in electric field that is generated by the first particles 101, the second particles 102 and the third particles 103 due to unbalance of the electric field the first electrode 11 and the second electrode 12.

Figure 10:
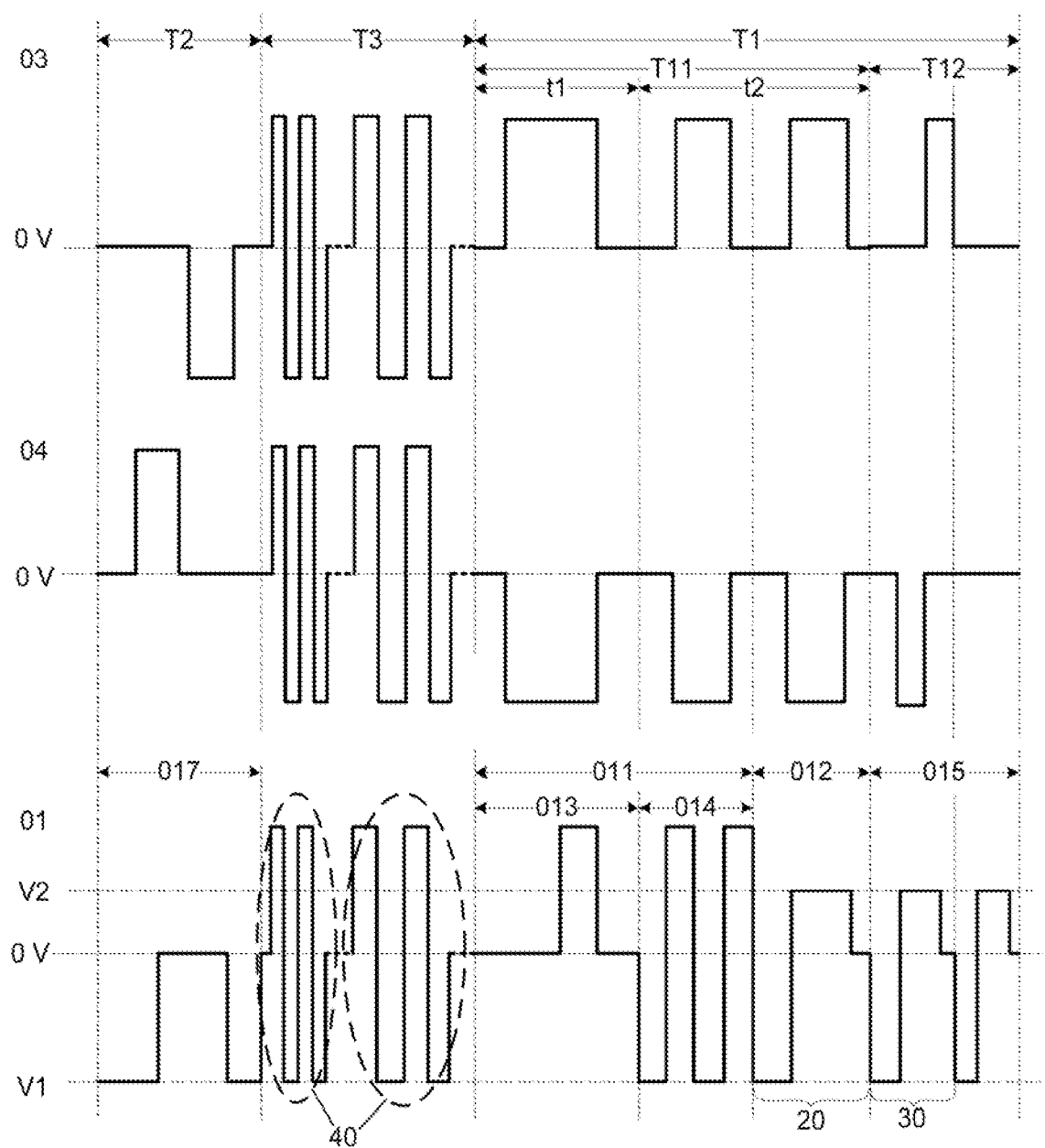
FIG. 10 is yet another waveform diagram of a first pulse signal, a third pulse signal and a fourth pulse signal, according to some embodiments.

Optionally, as shown in FIG. 10, each of the first, second and third image display stages further includes a shaking stage T3, which precedes the display stage T1 and follows the balance stage T2.

Each of the first pulse signal 01, the third pulse signal 03 and the fourth pulse signal 04 includes a plurality of sub-pulse signals 40 in the shaking stage T3, and each sub-pulse signal 40 includes alternating positive and negative voltages. Pulse widths of the plurality of sub-pulse signals 40 are gradually increased in an order in which the plurality of sub-pulse signals 40 are applied to the first electrode 11. Duty ratios of the first pulse signal 01, the third pulse signal 03 and the fourth pulse signal 04 in the shaking stage T3 are all 0.5.

In this case, before the display stage T1 of the first image display stage and after the balance stage T2 of the first image display stage, the method further includes: providing a plurality of sub-pulse signals in the first pulse signal 01 to the first electrode 11 in a shaking stage T3 of the first image display stage. Before the display stage T1 of the second image display stage and after the balance stage T2 of the second image display stage, the method further includes: providing a plurality of sub-pulse signals in the third pulse signal 03 to the first electrode 11 in the shaking stage T3 of the second image display stage. Before the display stage T1 of the third image display stage and after the balance stage T2 of the third image display stage, the method further includes: providing a plurality of sub-pulse signals in the fourth pulse signal T4 to the first electrode 11 in the shaking stage T3 of the third image display stage.

The number of sub-pulse signals 40 included in each of the first pulse signal 01, the third pulse signal 03 and the fourth pulse signal 04 in the shaking stage T3 is not limited, which may be set accordingly as needed. FIG. 10 shows an example in which each of the first pulse signal 01, the third pulse signal 03 and the fourth, pulse signal 04 includes two sub-pulse signals 40 in the shaking stage T3.

In addition, pulse widths of pulses in each sub-pulse signal 40 are the same.

In the embodiments, the shaking stage T3 is added between the balance stage T2 and the display stage T1, Each of the first pulse signal 01, the third pulse signal 03 and the fourth pulse signal 04 in the shaking stage T3 includes a plurality of sub-pulse signals 40, and each sub-pulse signal 40 includes alternating positive and negative voltages. Pulse widths of the plurality of sub-pulse signals 40 are gradually increased according to a time sequence in which the plurality of sub-pulse signals 40 are applied>to the first electrode 11. In this way, in the shaking stage T3, the first particles 101, the second particles 102 and the third particles 103 may rapidly move for sufficiently separating, and then slowly mix for uniformly mixing, so that the first particles 101, the second particles 102 and the third particles 103 may move rapidly and accurately in the display stage T1, thereby achieving a better display effect.

In this case, waveforms of the second pulse signal 02 in the balance stage T2 and the shaking stage T3 may be the same as waveforms of the first pulse signal 01 in the balance stage T2 and the shaking stage T3 respectively, which will not be described herein again.

Optionally, as shown in FIG. 13, the method of driving the electronic paper display apparatus 1 further includes S131 and S132.

In S131, the controller 50 receives a luminance value of the third color displayed by the microcup 10 in the display stage T1 detected for a first time, and increases the number of first pulse units 20 in the first sub-pulse signal 012 in response to determining that the luminance value of the third color is not, within a first preset luminance range to adjust the luminance of the third color for a first time.

In an example where the third color is red, the first preset luminance range is between 27 and 30, inclusive. The first preset luminance range may be used to measure the luminance of the microcup 10 when it displays red. In this case, if the luminance value of the third color displayed by the microcup 10 is not within the first preset luminance range it means that the luminance value of the third color is less than 27 or greater than 30.

Herein, if the luminance value of the third color displayed by the microcup 10 in the display stage T1 is not within the first preset luminance range, the controller 50 determines the number of first pulse units 20 in the first sub-pulse signal 012 according to the display effect. For example, according to the display effect, one first pulse unit 20 may be added, or two or more first pulse units 20 may be added. If the number of first pulse units 20 is too large, the first particles 101 may move towards the display side of the microcup 10, thereby causing the ghost of the first color to occur in the displayed third color. Therefore, in some embodiments the number of the added first pulse units 20 is greater than 1 and less than 10.

In S132, the controller 50 receives a chromaticity value of the third color displayed by the microcup 10 in the display stage T1 detected for a first time, and increases a duration of the zero voltage in at least one first pulse unit 20 in the first sub-pulse signal 012 or a duration of the second voltage V2 in at least one second pulse unit 30 in the fourth sub-pulse signal 015 in response to determining that the chromaticity value of the third color displayed by the microcup 10 is not within a first preset chromaticity range, so as to adjust the chromaticity of the third color for a first time.

In an example where the third color is red, the first preset chromaticity range is between 38 and 45, inclusive. The first preset chromaticity range may be used to measure the chromaticity of the microcup 10 when it displays red. In this case, if the chromaticity value of the third color displayed by the microcup 10 is not within the first preset chromaticity range, it means that the chromaticity value of the third color is less than 38 or greater than 45.

It will be noted that the luminance value and the chromaticity value in some examples of the present disclosure may be measured by a spectrophotometer (for example, a spectrophotometer with model number CM700D). Other measuring instruments may also be used, and data of the luminance value and the chromaticity value measured by using the other measuring instruments may be converted to data of the luminance value and the chromaticity value measured by using the spectrophotometer.

It will be noted that the luminance value and the chromaticity value in some examples of the present disclosure may be respectively represented by the luminance index and the chromaticity index in the CIE LAB, color space system.

Herein, in a case where the chromaticity value of the third color displayed by the microcup 10 in the display stage T1 is not within the first preset chromaticity range, there is no limitation on the duration of the zero voltage in the at least one first pulse unit 20 or the duration of the second voltage V2 in the at least one second pulse unit 30 which may be set accordingly as needed.

In a case where the first pulse signal 01 includes a plurality of first pulse units 20, the duration of the zero voltage in one first pulse unit 20 may be adjusted, or the durations of the zero voltages in a plurality of first pulse units 20 may be adjusted. In a case, where the first pulse signal 01 includes a plurality of second pulse units 30, the duration of the second voltage V2 in one second pulse unit 30 may be adjusted, or the durations of the second voltages V2 in a plurality of second pulse units 30 may be adjusted.

It will be understood that, if the luminance value of the third color displayed by the microcup 10 in the display stage T1 is within the first preset luminance range and the chromaticity value of the third color is within the first preset chromaticity range, the first pulse signal 01 applied to the first electrode 11 is not adjusted.

In some embodiments, the controller 50 receives both the luminance value and the chromaticity value of the third color displayed by each microcup 10 that are detected, and determines whether the first pulse signal 01 applied to the first electrode 11 is required to be adjusted. Moreover, the first preset luminance range and the first preset chromaticity range of each microcup 10 may be the same or slightly different.

In this case, the controller 50 may first determine whether the luminance value of the third color displayed by the microcup 10 in the display stage T1 is within the first preset luminance range, and then determines whether the chromaticity value of the third color displayed by the microcup 10 in the display stage T1 is within the first preset chromaticity range. Or, the controller 50 may first determine whether the chromaticity value of the third color displayed by the microcup 10 in the display stage T1 is within the first preset chromaticity range, and then determines whether the luminance value of the third color displayed by the microcup 10 in the display stage T1 is within the first preset luminance range. Of course, the controller 50 may perform determinations of the luminance value and the chromaticity value of the third color displayed by the microcup 10 in the display stage T1 simultaneously.

In the embodiments, the first pulse unit 20 in the first sub-pulse signal 012 is used to move the third particles 103 to a position closer to the display side of the electronic paper display apparatus 1 than the first particles 101, so that the microcup 10 displays the third color. Therefore, in a case where the luminance value of the third color displayed by the microcup 10 is not within the first preset luminance range, increasing the number of first pulse units 20 in the first sub-pulse signal 012 may improve the luminance of the third color displayed by the microcup 10. In addition, in a case where the chromaticity value displayed by the microcup 10 is not within the first preset chromaticity range, if the duration of the zero voltage in the at least one first pulse unit 20 of the first sub-pulse signal 012 is increased, the third particles 103 may move towards the display side of the electronic paper display apparatus 1 for a longer time because of inertia. In this way, when the microcup 10 displays the third color, a ghost of the first color may be better avoided and the chromaticity of the displayed third color may be improved. Furthermore, the second voltage V2 in the at least one second, pulse unit 30 of the fourth sub-pulse signal 015 may enable the third particles 103 to move to a position closer to the display side of the electronic paper display apparatus 1 than the first particles 101, so that the microcup 10 displays the third color. Therefore, when the microcup 10 displays the third color, increasing the duration of the second voltage V2 in the at least one second pulse unit 30 may improve the chromaticity of the third color.

After the luminance and the chromaticity of the third color displayed by the microcup 10 are adjusted for the first time, the luminance value of the third color displayed by the microcup 10 may still not be within the first preset luminance range, and the chromaticity value of the third color may still not be within the first preset chromaticity range. In this case, after the luminance and the chromaticity of the third color displayed by the microcup 10 are adjusted for the first time, optionally, as shown in FIG. 14, the method of driving the electronic paper display apparatus 1 further includes S133 and S134.

In S133, the controller 50 receives an adjusted luminance value and an adjusted chromaticity value of the third color displayed by the microcup 10 in the display stage T1 detected for a second time, and determines whether the adjusted luminance value of the third color displayed by the microcup 10 is within the first preset luminance range, and whether the adjusted chromaticity value of the third color displayed by the microcup 10 is within the first preset chromaticity range.

In S134, the controller 50 adjusts the duration of the second voltage V2 in the at least one second pulse unit 30 of the fourth sub-pulse signal 015 in response to determining that the adjusted luminance value of the third color displayed by the microcup 10 is not within the first preset luminance range, and/or the adjusted chromaticity value of the third color displayed by the microcup 10 is not within the first preset chromaticity range.

When the microcup 10 displays the third color, the luminance and the chromaticity of the third color displayed by the microcup 10 may be finely adjusted by adjusting the duration of the second voltage V2 in the at least one second pulse unit 30.

Optionally, as shown in FIG. 15, the method of driving the electronic paper display apparatus 1 further includes S151 and S152.

In S151, the controller 50 receives a luminance value of the first color displayed by the microcup 10 in the display stage T1 detected for a first time, and increases the number of pulses of the third pulse signal 03 in the second sub-display stage t2 or a pulse width of each pulse in the third pulse signal 03 in the second sub-display stage t2 in response to determining that the luminance value of the first color displayed by the microcup 10 is not within a second preset luminance range, so as to adjust the luminance of the first color for a first time, In an example where the first color is black, the second preset luminance range is between 0 and 16, inclusive. The second preset luminance range may be, used to measure the luminance of the microcup 10 when it displays black. In this case, if the, luminance value of the first color displayed by the microcup 10 is not within the second preset luminance range, it means that the luminance value of the first color is greater than 16.

Herein, if the luminance value of the first color displayed by the microcup 10 in the display stage T1 is not within the second preset luminance range, the number of added pulses of the third pulse signal 03 in the second sub-display stage t2 may be determined according to the actual luminance of the displayed second color. For example, according to the actual luminance of the displayed first color, one pulse may be added, or two or more pulses may be added. With respect to the third pulse signal 03 in the second sub-display stage t2, a pulse width of each pulse is not limited, and may be set according to the actual luminance of the displayed first color.

In S152, the controller receives a chromaticity value of the first color displayed by the microcup 10 in the display stage T1 detected for a first time. In addition, in response to determining that the chromaticity value of the first color displayed by the microcup 10 is not within a second preset chromaticity, range, the controller 50 increases a duration of the effective voltage in each sub-pulse signal 40 of the third pulse signal 03 in the shaking stage T3, which has opposite polarity with respect to the effective voltage of the third pulse signal 03 in the display stage T1, and adjusts the pulse width of each pulse in the third pulse signal 03 in the second sub-display stage t2, so as to adjust the chromaticity of the first color for a first time.

In an example where the first color is black, the second preset chromaticity range is between 0 and 4, inclusive. The second preset chromaticity range may be used to measure the chromaticity of the microcup 10 when it displays black. In this case, if the chromaticity value of the first color displayed by the microcup 10 is not within the second preset chromaticity range, it means that the chromaticity value of the first color is less than 0 or greater than 4.

Herein, the third pulse signal 03 includes a plurality of sub-pulse signals 40 in the shaking stage T3, Each sub-pulse signal 40 includes alternating positive and negative voltages. In a case where the effective voltage in the third pulse signal 03 in the display stage T1 is a positive voltage, the controller 50 increases a duration of a negative voltage in each sub-pulse signal 40 of the third pulse signal 03. In a case where the effective voltage in the third pulse signal 03 in the display stage T1 is a negative voltage, the controller 50 increases a duration of a positive voltage in each sub-pulse signal 40 of the third pulse signal 03.

It will be understood that, if it is determined that the luminance value of the first color displayed by the microcup 10 in the display stage T1 is within the second preset luminance range and the chromaticity value of the first color is within the second preset chromaticity range, the third pulse signal 03 applied to the first electrode 11 is not adjusted.

In some embodiments, both the luminance and the chromaticity of each microcup 10 displaying the first color are detected, and it is determined whether the third pulse signal 03 is required to be adjusted, Moreover, the second preset luminance range of each microcup 10 may be the same or slightly different, and the second preset chromaticity range of each microcup 10 may be the same or slightly different.

In this case, the controller 50 may first determine whether the luminance value of the first color displayed by the microcup 10 in the display stage T1 is within the second preset luminance range, and then determine whether the chromaticity value of the first color displayed by the microcup 10 in the display stage T1 is within the second preset chromaticity range. Or, the controller 50 may first determine whether the chromaticity value of the first color displayed by the microcup 10 in the display stage T1 is within the second preset chromaticity range, and then determine whether the luminance value of the first color displayed by the microcup 10 in the display stage T1 is within the second preset luminance range. Of course, the controller 50 may perform the determinations of the luminance value and the chromaticity value of the first color displayed by the microcup 10 in the display stage T1 simultaneously.

In the embodiments, the luminance of the first color displayed by the microcup 10 in the display stage T1 is improved by increasing the number of pulses of the third pulse signal 03 in the second sub-display stage t2 or increasing the pulse width of each pulse of the third pulse signal 03 in the second sub-display stage t2. In the shaking stage T3, by increasing the duration of the effective voltage of the third pulse signal 03, which has opposite polarity with respect to the effective voltage of the third pulse signal 03 in the display stage T1, and adjusting the pulse width of each pulse of the third pulse signal 03 in the second sub-display stage t2, the chromaticity of the first color displayed by the microcup 10 in the display stage T1 may be improved.

After the luminance and the chromaticity of the first color displayed by the microcup 10 are adjusted for the first time, the adjusted luminance value of the first color displayed by the microcup 10 may not be within the second preset luminance range, and the adjusted chromaticity value of the first color may not be within the second preset chromaticity range, In this case, after the luminance and the chromaticity of the first color displayed by the microcup 10 are adjusted for the first time, optionally, as shown in FIG. 16, the method of driving the electronic paper display apparatus 1 further includes S153 and S154.

In S153, the controller 50 receives both the adjusted luminance value and the adjusted chromaticity value of the first color displayed by the microcup 10 in the display stage T1 that are detected for a second time, and determines whether the adjusted luminance value of the first color displayed by the microcup 10 is within the second preset luminance range, and whether the adjusted chromaticity value of the first color displayed by the microcup 10 is within the second preset chromaticity range In S154, the controller 50 adjusts a pulse width of at least one pulse in the third pulse signal 03 in the second display stage T12 in response to determining that the adjusted luminance value of the first color displayed by the microcup 10 is not within the second preset luminance range, and/or the adjusted chromaticity value of the first color displayed by the microcup 10 is not within the second preset chromaticity range.

Herein, when the microcup 10 displays the first color, the luminance and the chromaticity of the first color displayed by the microcup 10 may be finely adjusted by adjusting the pulse width of the at least one pulse in the third pulse signal 03 in the second display stage T12.

Optionally, as shown in FIG. 17, the method of driving the electronic paper display apparatus 1 further includes S171 and S172.

In S171, the controller 50 receives a luminance value of the second color displayed by the microcup 10 in the display stage T1 detected for a first time, and increases the number of pulses of the fourth pulse signal 04 in the second sub-display stage t2 or a pulse width of each pulse in the fourth pulse signal 04 in the second sub-display stage t2 in response to determining that the luminance value of the second color displayed by the microcup 10 is not within a third preset luminance range, so as to adjust the luminance of the second color for a first time.

In an example where the second color is white, the third preset luminance range is between 68 and 100, inclusive. The third preset luminance range may be used, to measure the luminance of the microcup 10 when it displays white. In this case, if the luminance value of the second color displayed by the microcup 10 is not within the third preset luminance range, it means that the luminance value of the second color is less than 68.

Herein, if the luminance value of the second color displayed by the microcup 10 in the display stage T1 is not within the third preset luminance range, the number of added pulses of the fourth pulse signal 04 in the second sub-display stage t2 may be determined according to the actual luminance of the displayed second color. For example, according to the actual luminance of the displayed second color, one pulse may be added, or two or more pulses may be added. With respect to the fourth pulse signal 04 in the second sub-display stage t2, a pulse width of each pulse is not limited, and may be set according to the actual luminance of the displayed second color.

In S172, the controller 50 receives a chromaticity value of the second color displayed by the microcup 10 in the display stage T1 detected for a first time, and increases time between any two adjacent pulses in the fourth pulse signal 04 in the first display stage T11 in response to determining that the chromaticity value of the second color displayed by the microcup 10 is not within a third preset chromaticity range to adjust the chromaticity of the second color for a first time.

In an example where the second color is white, the third preset chromaticity range is between 0 and 0.5, inclusive. The third preset chromaticity range may be used to measure the chromaticity of the microcup 10 when it displays white. In this case, if the chromaticity value of the second color displayed by the microcup 10 is not within the third preset chromaticity range, it means that the chromaticity value of the second color is less than 0 or greater than 0.5.

Herein, the time between any two adjacent pulses in the fourth pulse signal 04 in the first display stage T11 refers to a duration of the zero voltage in the fourth pulse signal 04 in the first display stage T11.

It will be understood that, if it is determined that the luminance value of the second color displayed by the microcup 10 in the display stage T1 is within the third preset luminance range and the chromaticity value of the second color is within the third preset chromaticity range, the fourth pulse signal 04 applied to the first electrode 11 is not adjusted.

In some embodiments, the controller 50 receives both the luminance value and the chromaticity value of the second color displayed by each microcup 10 that are detected, and determines whether the fourth pulse signal 04 is required to be adjusted. Moreover, the third preset luminance range of each microcup 10 may be the same or slightly different, and the third preset chromaticity range of each microcup 10 may be the same or slightly different.

In this case, the controller 50 may first determine whether the luminance value, of the second color displayed by the microcup 10 in the display stage T1 is within the third preset luminance range, and then determine whether the chromaticity value of the second color displayed by the microcup 10 in the display stage T1 is within the third preset chromaticity range. Or, the controller 50 may first determine whether the chromaticity value of the second color displayed by the microcup 10 in the display stage T1 is within the third preset chromaticity range, and then determines whether the luminance value of the second color displayed by the microcup 10 in the display stage T1 is within the third preset luminance range. Of course, the controller 50 may perform the determinations of the luminance value and the chromaticity value of the second color displayed by the microcup 10 in the display stage T1 simultaneously.

In the embodiments, the luminance of the second color displayed by the microcup 10 in the display stage T1 is improved by increasing the number of pulses of the fourth pulse signal 04 in the second sub-display stage t2 or increasing the pulse width of each pulse of the fourth pulse signal 04 in the second sub-display stage t2. By increasing the time between any two adjacent pulses in the fourth pulse signal 04 in the first display stage T11, the second particles 102 may move toward the display side of the electronic paper display apparatus 1 for a longer time due to inertia, thereby improving the chromaticity of the second color when the microcup 10 displays the second color.

After the luminance and the chromaticity of the second color displayed by the microcup 10 are adjusted for the first time, the adjusted luminance value of the second color, displayed by the microcup 10 may not be within the third preset luminance range, and the adjusted chromaticity value of the second color may not be within the third preset chromaticity range. In this case, after the luminance and the chromaticity of the second color displayed by the microcup 10 are adjusted for the first time, optionally, as shown in FIG. 18, the method of driving the electronic paper display apparatus 1 further includes S173 and S174.

In S173, the controller 50 receives both the adjusted luminance value and the adjusted chromaticity value of the second color displayed by the microcup 10 in the display stage T1 that are detected for a second time, and determines whether the adjusted luminance value of the second color displayed by the microcup 10 is within the third preset luminance range, and whether the adjusted chromaticity value of the second color is within the third preset chromaticity range.

In S174, the controller 50 adjusts a pulse width of at least one pulse in the fourth pulse, signal 04 in the second display stage T12 in response to determining that the adjusted luminance value of the second color is not within the third preset luminance range, and/or the adjusted chromaticity value of the second color is not within the third preset chromaticity range.

Herein, when the microcup 10 displays the second color, the luminance and the chromaticity of the second color may be finely adjusted by adjusting the pulse width of the at least one pulse in the fourth pulse signal 04 in the second display stage T12.

The luminance and the chromaticity of the first color, the second color and the third color are respectively detected and an order in which pulse signals are adjusted is not limited. For example, the first color is black, the second color, is white, and the third color is red. In this case, the electronic paper display apparatus 1 is able to implement black, white and red display.

Figure 19:
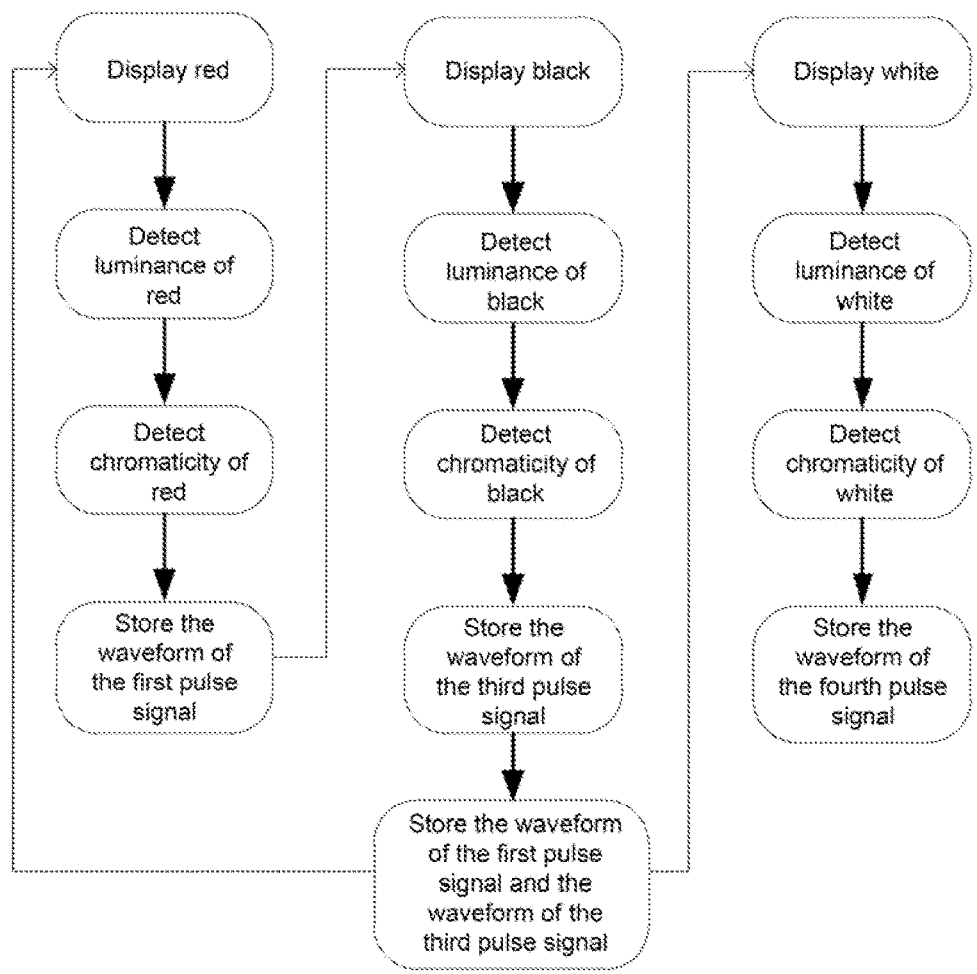
FIG. 19 is a schematic flow diagram of adjusting waveforms of pulse signals, according to some embodiments.

For example, as shown in FIG. 19 in a first step, a luminance value of the red is first detected and a waveform of the first pulse signal 01 is adjusted according the luminance value, then a chromaticity value of the red is detected and the waveform of the first pulse signal 01 is adjusted according to the chromaticity value. Afterwards, the adjusted waveform of the first pulse signal 01 is stored, so as to provide the adjusted first pulse signal 01 to the first electrode 11 when any microcup 10 displays the red in a next image display stage.

In a second step, a luminance value of black is first detected and a waveform of the third pulse signal 03 is adjusted according to the luminance value, then a chromaticity value of the black is detected and the waveform of the third pulse signal 03 is adjusted according to the chromaticity value. Afterwards, the adjusted waveform of the third pulse signal 03 is stored, so as to provide the adjusted third pulse signal 03 to the first electrode 11 when any microcup 10 displays the black in a next image display stage.

In a third step, a luminance value of the white is first detected and a waveform of the fourth pulse signal 04 is adjusted according to the luminance value, then a chromaticity value of the white is detected and the waveform of the fourth pulse signal 04 is adjusted according to the chromaticity value. Afterwards, the adjusted waveform of the, fourth pulse signal 04 is stored, so as to provide the adjusted fourth pulse signal 04 to the first electrode 11 when any microcup 10 displays the white in a next image display stage.

After the second step is completed, the third step is performed, or the first step may be performed again to redetect the luminance value and the chromaticity value of the red and readjust the first pulse signal 01. After waveforms of pulse signals corresponding to all colors are stored, the waveforms of the stored pulse signals may be locked, so as to output, the locked pulse signals to the first electrode 11 of the microcup 10,In some embodiments, as shown in FIG. 20, the electronic paper display apparatus 1 includes the controller 50, and the controller 50 is configured to provide the first pulse signal 01 to the first electrode 11 when the microcup 10 displays the third color. The first pulse signal 01 includes the preprocessing signal 011 and the first sub-pulse signal 012 that are sequentially applied to the first electrode 11 in the display stage T1 of the first image display stage. Under action of the preprocessing signal 011, the first particles 101 and the third particles 103 are mixed together and the first, particles 101 and the third particles 103 are closer to the display side of the electronic paper display apparatus 1 than the second particles 102. Under action of the first sub-pulse signal 012, the third particles 103 are closer to the display side of the electronic paper display apparatus 1 than the first particles 101 and the second particles 102, so that the microcup 10 displays the third color.

Optionally, as shown in FIG. 21, the electronic paper display apparatus 1 further includes a temperature sensor 70, and the temperature sensor 70 is configured to detect the ambient temperature. The controller 50 is configured to: determine whether the ambient temperature detected by the temperature sensor 70 is within the preset temperature that ranges from 0° C. to 10° C.; provide the first pulse signal 01 to the first electrode 11 in response to determining that the detected ambient temperature is within the preset temperature range; and provide the second pulse signal 02 to the first electrode 11 in response to determining that the detected ambient temperature is greater than the maximum temperature in the preset temperature range.

Optionally, the controller 50 is configured to: receive the luminance value of the third color displayed by the microcup 10 in the display stage T1 detected for the first time; receive the chromaticity value of the third color displayed by the microcup 10 in the display stage T1 detected for the first time; increase the number of first pulse units 20 in the first sub-pulse signal 012 in response to determining that the luminance value of the third color displayed by the microcup 10 is not within the first preset luminance range to adjust the luminance of the third color for the first time; and increase the duration of the zero voltage in the at least one first pulse unit 20 in the first sub-pulse signal 012 or the duration of the second voltage V2 in at least one second pulse unit 30 in the fourth sub-pulse signal 015 in response to determining that the chromaticity value of the third color displayed by the microcup 10 is not within the first preset chromaticity range to adjust the chromaticity of the, third color for the first time.

In this case the controller 50 is configured to receive both the adjusted luminance value and the adjusted chromaticity value of the third color displayed by the microcup 10 in the display stage T1 detected for the second time; determine whether the adjusted luminance value of the third color displayed by the microcup 10 is within the first preset luminance range and whether the adjusted chromaticity value of the third color displayed by the microcup 10 is within the first preset chromaticity range; and adjust the duration of the second voltage V2 in the at least one second pulse unit 30 of the fourth sub-pulse signal 015 in response to determining that the adjusted luminance value of the third color displayed by the microcup 10 is not within the first preset luminance range, and/or the adjusted chromaticity value of the third color displayed by the microcup 10 is not within the first preset chromaticity range.

Optionally, the controller 50 is further configured to: receive the luminance value of the first color displayed by the microcup 10 in the display stage T1 detected for the first time receive the chromaticity value of the first color displayed by the microcup 10 in the display stage T1 detected for the first time, increase the number of pulses of the third pulse signal 03 in the second sub-display stage t2 or a pulse width of each pulse of the third pulse signal 03 in the second sub-display stage t2 in response to determining that the luminance value of the first color displayed by the microcup 10 is not within the second preset luminance range to adjust the luminance of the first color for the first time; and increase the duration of the effective voltage of the third pulse signal 03 in the shaking stage T3, which has opposite polarity with respect to the effective voltage of the third pulse signal 03 in the display stage T1, and adjust the pulse width of each pulse in the third pulse signal 03 in the second sub-display stage t2 in response to determining that the chromaticity value of the first color displayed by the microcup 10 is not within the second preset chromaticity range to adjust the chromaticity of the first color for the first time.

In this case, the controller 50 is configured to: receive the adjusted luminance value and the adjusted chromaticity value of the first color displayed by the microcup 10 in the display stage T1 detected for the second time; determine whether the adjusted luminance value of the first color displayed by the microcup 10 is within the second preset luminance range, and whether the adjusted chromaticity value of the first color displayed by the microcup 10 is within the second preset chromaticity range; adjust the pulse width of at least one pulse in the third pulse signal 03 in the second display stage T12 in response to determining that the adjusted luminance value of the first color is not within the second preset luminance range, and/or the adjusted chromaticity value of the first color is not within the second preset chromaticity range.

Optionally, the controller 50 is configured to: receive the luminance value of the second color displayed by the microcup 10 in the display stage T1 detected for the first time; receive the chromaticity value of the second color displayed by the microcup 10 in the display stage T1 detected for the first time; increase the number of pulses of the fourth pulse signal 04 in the second sub-display stage t2 or a pulse width of each pulse of the fourth pulse signal 04 in the second sub-display stage t2 in response to determining that the luminance value of the second color is not within the third preset luminance range to adjust the luminance of the second color for a first time; and increase time between any two adjacent pulses in the fourth pulse signal 04 in the first display stage T11 in response to determining that the chromaticity value of the second color is not within the third preset chromaticity range to adjust the chromaticity of the second color for the first time.

In this case, the controller 50 is further configured to: receive the adjusted luminance value and the adjusted chromaticity value of the second color displayed by the microcup 10 in the display stage T1 detected for the second time; determine whether the adjusted luminance value of the second color is within the third preset luminance range, and whether the adjusted chromaticity value of the second color is within the third preset chromaticity range; adjust the pulse width of at least one pulse in the fourth pulse signal 04 in the second display stage T12 in response to determining that the adjusted luminance value of the second color is not within the third preset luminance range, and/or the adjusted chromaticity value of the second color is not within the third preset chromaticity range.

With respect to explanations of the controller 50 and the temperature sensor 70 in the electronic paper display apparatus 1 and technical effects brought by the controller 50 and the temperature sensor 70 in the electronic paper display apparatus 1, reference can be made to the foregoing contents regarding the method of driving the electronic paper display apparatus 1, which will not be described herein again.

The forgoing descriptions are merely specific implementation manners of the present disclosure, but the protection scope of the present disclosure is not limited thereto. Some technical solutions can be combined or one technical solution can be divided, which are not limited herein. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A method of driving an electronic paper display apparatus, the display apparatus comprising a microcup, a first electrode, a second electrode and a controller; the controller being connected to the first electrode; the first electrode and the second electrode being opposite to each other, and the microcup being disposed between the first electrode and the second electrode; the microcup including first particles of a first color, second particles of a second color and third particles of a third color; charge polarity of the first particles being opposite to charge polarity of the second particles, and the charge polarity of the first particles being the same as charge polarity of the third particles; specific charge of each first particle being greater than specific charge of each third particle; mobility of the first particle being greater than mobility of the third particle;

the method comprising:
providing, by the controller, a first pulse signal to the first electrode in a display stage of a first image display stage, including:
providing, by the controller, a preprocessing signal in the first pulse signal to the first electrode in the display stage of the first image display stage, so that the first particles and the third particles are mixed, and the first particles and the third particles are closer to a display side of the display apparatus than the second particles; and
providing, by the controller, a first sub-pulse signal in the first pulse signal to the first electrode in the display stage of the first image display stage after providing the preprocessing signal, so that the third particles are closer to the display side of the display apparatus than the first particles and the second particles and the microcup displays the third color, wherein
providing, by the controller, the preprocessing signal to the first electrode, includes:
providing, by the controller, a second sub-pulse signal to the first electrode, so that the first particles are closer to the display side of the display apparatus than the third particles and the third particles are closer to the display side of the display apparatus than the second particles, wherein an effective voltage of the second sub-pulse signal is a positive voltage or a negative voltage; and providing, by the controller, a third sub-pulse signal to the first electrode after providing the second sub-pulse signal, wherein the third sub-pulse signal is a pulse signal with alternating positive and negative voltages, an absolute value of a positive voltage of the third sub-pulse signal is equal to an absolute value of a negative voltage of the third sub-pulse signal, and a duty ratio of the third sub-pulse signal is 0.5.

2. The method according to claim 1, wherein providing, by the controller, the first sub-pulse signal to the first electrode, includes:

providing continuously and sequentially, by the controller, a first voltage and a second voltage that are included in a first pulse unit to the first electrode at least once, wherein a duration of the first voltage in the first pulse unit is less than a duration of the second voltage in the first pulse unit; and polarity of the first voltage in the first pulse unit is opposite to polarity of the effective voltage of the second sub-pulse signal, polarity of the second voltage in the first pulse unit is the same as the polarity of the effective voltage of the second sub-pulse signal, and the second voltage in the first pulse unit is less than the effective voltage of the second sub-pulse signal.

3. The method according to claim 2, wherein after providing the second voltage in the first pulse unit to the first electrode, providing, by the controller, the first sub-pulse signal to the first electrode, further includes:

providing, by the controller, a zero voltage in the first pulse unit to the first electrode.

4. The method according to claim 3, wherein after providing the first sub-pulse signal to the first electrode in the display stage of the first image display stage, the method further comprises:

providing, by the controller, a fourth sub-pulse signal in the first pulse signal to the first electrode in the display stage of the first image display stage, wherein the fourth sub-pulse signal includes a plurality of second pulse units, each second pulse unit includes a first voltage, a second voltage and a zero voltage sequentially applied to the first electrode, and a duration of the first voltage in the second pulse unit is less than a duration of the second voltage in the second pulse unit; and in the plurality of second pulse units, durations of first voltages are gradually reduced in an order in which the plurality of second pulse units are applied to the first electrode, durations of second voltages are gradually reduced in the order, and durations of zero voltages are gradually reduced in the order.

5. The method according to claim 4, wherein before the display stage of the first image display stage, the method further comprises:

providing, by the controller, a fifth sub-pulse signal in the first pulse signal to the first electrode in a balance stage of the first image display stage, wherein polarity of an effective voltage in the fifth sub-pulse signal is the same as the polarity of the first voltage in the first sub-pulse signal, and a product of an absolute value of the effective voltage in the fifth sub-pulse signal and a total time of the effective voltage in the fifth sub-pulse signal is equal to an absolute value of a difference between a product of an absolute value of the first voltage in both the first sub-pulse signal and the fourth sub-pulse signal and a total time of the first voltage in both the first sub-pulse signal and the fourth sub-pulse signal and a product of an absolute value of the second voltage in both the first sub-pulse signal and the fourth sub-pulse signal and a total time of the second voltage in both the first sub-pulse signal and the fourth sub-pulse signal.

6. The method according to claim 5, wherein the effective voltage in the fifth sub-pulse signal is equal to the first voltage in the first sub-pulse signal.

7. The method according to claim 4, further comprising:

receiving, by the controller, a luminance value of the third color displayed by the microcup in the display stage of the first image display stage, which is detected for a first time;

determining, by the controller, whether the luminance value of the third color is within a first preset luminance range;

increasing, by the controller, a number of first pulse units in the first sub-pulse signal in response to determining that the luminance value of the third color is not within the first preset luminance range;

receiving, by the controller, a chromaticity value of the third color displayed by the microcup in the display stage of the first image display stage, which is detected for a first time;

determining, by the controller, whether the chromaticity value of the third color is within a first preset chromaticity range; and increasing, by the controller, a duration of a zero voltage in at least one first pulse unit or increasing, by the controller, a duration of a second voltage in at least one second pulse unit in response to determining that the chromaticity value of the third color is not within the first preset chromaticity range.

8. The method according to claim 7, wherein after luminance and the chromaticity of the third color displayed by the microcup are adjusted for a first time, the method further comprises:

receiving, by the controller, an adjusted luminance value and an adjusted chromaticity value of the third color displayed by the microcup in the display stage of the first image display stage, which are detected for a second time;

determining, by the controller, whether the adjusted luminance value of the third color is within the first preset luminance range;

determining, by the controller, whether the adjusted chromaticity value of the third color is within the first preset chromaticity range; and adjusting the duration of the second voltage in the at least one second pulse unit in response to determining that the adjusted luminance value of the third color is not within the first preset luminance range, and/or the adjusted chromaticity value of the third color is not within the first preset chromaticity range.

9. The method according to claim 2, wherein before providing the first pulse signal to the first electrode, the method further comprises:

receiving, by the controller, an ambient temperature; and determining, by the controller, whether the ambient temperature is within a preset temperature range of 0° C. to 10° C., and providing, by the controller, the first pulse signal to the first electrode, includes:

providing, by the controller, the first pulse signal to the first electrode in response to determining that the ambient temperature is within the preset temperature range.

10. The method according to claim 9, further comprising:
providing, by the controller, a second pulse signal to the first electrode in the display stage of the first image display stage in response to determining that the ambient temperature is greater than a maximum temperature in the preset temperature range; wherein the second pulse signal includes a six sub-pulse signal including at least one third pulse unit, each third pulse unit includes a third voltage and a fourth voltage, and the third voltage and the fourth voltage are sequentially applied to the first electrode; and
a duration of the third voltage in the third pulse unit is less than a duration of the fourth voltage in the third pulse unit; and polarity and a value of the third voltage in the third pulse unit are the same as the polarity and a value of the first voltage in the first sub-pulse signal respectively, polarity of the fourth voltage in the third pulse unit is the same as the polarity of the second voltage in the first sub-pulse signal, and an absolute value of the fourth voltage in the third pulse unit is less than the absolute value of the second voltage in the first sub-pulse signal.

11. The method according to claim 1, further comprising:
providing, by the controller, a third pulse signal to the first electrode in a display stage of a second image display stage, so that the first particles are closer to the display side of the display apparatus than the second particles and the third particles, and the microcup displays the first color; and
providing, by the controller, a fourth pulse signal to the first electrode in a display stage of a third image display stage, so that the second particles are closer to the display side of the display apparatus than the first particles and the third particles, and the microcup displays the second color.

12. The method according to claim 11, wherein providing, by the controller, the preprocessing signal and the first sub-pulse signal to the first electrode in the display stage of the first image display stage, includes:
providing, by the controller, the second sub-pulse signal to the first electrode in a first sub-display stage of a first display stage in the display stage of the first image display stage; and
providing, by the controller, the third sub-pulse signal and the first sub-pulse signal continuously to the first electrode in a second sub-display stage of the first display stage; wherein
an effective voltage of the third pulse signal in the display stage of the second image display stage is a positive voltage or a negative voltage, and polarity of the effective voltage in the third pulse signal is the same as polarity of the effective voltage in the second sub-pulse signal;
the third pulse signal includes a plurality of pulses, a pulse width of each pulse in the third pulse signal in a first sub-display stage of a first display stage in the display stage of the second image display stage is the same, and a pulse width of each pulse in the third pulse signal in a second sub-display stage of the first display stage of the display stage of the second image display stage is the same; and the pulse width of each pulse in the third pulse signal in the first sub-display stage is greater than the pulse width of each pulse in the third pulse signal in the second sub-display stage;
in the display stage of the third image display stage, an effective voltage in the fourth pulse signal is a positive voltage or a negative voltage, and polarity of the effective voltage in the fourth pulse signal is opposite to the polarity of the effective voltage in the second sub-pulse signal; and
the fourth pulse signal includes a plurality of pulses, a pulse width of each pulse in the fourth pulse signal in a first sub-display stage of a first display stage in the display stage of the third image display stage is the same, and a pulse width of each pulse in the fourth pulse signal in a second sub-display stage of the first display stage in the display stage of the third image display stage is the same; and the pulse width of each pulse in the fourth pulse signal in the first sub-display stage is greater than the pulse width of each pulse in the fourth pulse signal in the second sub-display stage.

13. The method according to claim 12, wherein each of display stages of the first image display stage, the second image display stage and the third image display stage further includes a second display stage following the first display stage;
the third pulse signal includes at least one pulse in the second display stage of the second image display stage, and a pulse width of each pulse in the third pulse signal in the second display stage of the second image display stage is less than the pulse width of each pulse in the third pulse signal in the second sub-display stage of the second image display stage; and
the fourth pulse signal includes at least one pulse in the second display stage of the third image display stage, and a pulse width of each pulse in the fourth pulse signal in the second display stage of the third image display stage is less than the pulse width of each pulse in the fourth pulse signal in the second sub-display stage of the third image display stage.

14. The method according to claim 13, wherein each of the first image display stage, the second image display stage and the third image display stage further includes a balance stage preceding the display stage;
polarity of an effective voltage in the third pulse signal in the balance stage in the second image display stage is opposite to polarity of an effective voltage in the third pulse signal in the display stage in the second image display stage; a product of an absolute value of the effective voltage in the third pulse signal in the balance stage in the second image display stage and a total time of the effective voltage in the third pulse signal in the balance stage in the second image display stage is equal to a product of an absolute value of the effective voltage in the third pulse signal in the display stage in the second image display stage and the total time of the effective voltage in the third pulse signal in the display stage in the second image display stage; and
polarity of an effective voltage in the fourth pulse signal in the balance stage in the third image display stage is opposite to polarity of an effective voltage in the fourth pulse signal in the display stage in the third image display stage; a product of an absolute value of the effective voltage in the fourth pulse signal in the balance stage in the third image display stage and a total time of the effective voltage in the fourth pulse signal in the balance stage in the third image display stage is equal to a product of an absolute value of the effective voltage in the fourth pulse signal in the display stage in the third image display stage and the total time of the effective voltage in the fourth pulse signal in the display stage in the third image display stage.

15. The method according to claim 14, wherein the absolute value of the effective voltage in the third pulse signal in the balance stage in the second image display stage is equal to the absolute value of the effective voltage in the third pulse signal in the display stage in the second image display stage; and the absolute value of the effective voltage in the fourth pulse signal in the balance stage in the third image display stage is equal to the absolute value of the effective voltage in the fourth pulse signal in the display stage in the third image display stage.

16. The method according to claim 14, wherein before the display stage of the first image display stage and after the balance stage of the first image display stage, the method further comprises: providing a plurality of sub-pulse signals in the first pulse signal to the first electrode in a shaking stage of the first image display stage;

before the display stage of the second image display stage and after the balance stage of the second image display stage, the method further comprises: providing a plurality of sub-pulse signals in the third pulse signal to the first electrode in a shaking stage of the second image display stage; and before the display stage of the third image display stage and after the balance stage of the third image display stage, the method further comprises: providing a plurality of sub-pulse signals in the fourth pulse signal to the first electrode in a shaking stage of the third image display stage, wherein each sub-pulse signal includes alternating positive and negative voltages, pulse widths of the plurality of sub-pulse signals are gradually increased in an order in which the plurality of sub-pulse signals are applied to the first electrode, and duty ratios of the first pulse signal, the third pulse signal and the fourth pulse signal in the shaking stage are all 0.5.

17. The method according to claim 16, further comprising:

receiving, by the controller, a luminance value of the first color displayed by the microcup in the display stage of the second image display stage, which is detected for the first time;

determining, by the controller, whether the luminance value of the first color is within a second preset luminance range;

increasing, by the controller, a number of pulses in the third pulse signal in the second sub-display stage of the second image display stage or increasing, by the controller, a pulse width of each pulse in the third pulse signal in the second sub-display stage of the second image display stage in response to determining that the luminance value of the first color is not within the second preset luminance range; and receiving, by the controller, a chromaticity value of the first color displayed by the microcup in the display stage of the second image display stage, which is detected for the first time;

determining, by the controller, whether the chromaticity value of the first color is within a second preset chromaticity range;

increasing, by the controller, a duration of an effective voltage in the third pulse signal in the shaking stage that has opposite polarity with respect to the effective voltage in the third pulse signal in the display stage in response to determining that the chromaticity value of the first color is not within the second preset chromaticity range;

adjusting, by the controller, a pulse width of each pulse in the third pulse signal in the second sub-display stage;

receiving, by the controller, a luminance value of the second color displayed by the microcup in the display stage of the third image display stage, which is detected for the first time;

determining, by the controller, whether the luminance value of the second color is within a third preset luminance range;

increasing, by the controller, a number of pulses in the fourth pulse signal in the second sub-display stage or increasing, by the controller, a pulse width of each pulse in the fourth pulse signal in the second sub-display stage in response to determining that the luminance value of the second color is not within the third preset luminance range; and receiving, by the controller, a chromaticity value of the second color displayed by the microcup in the display stage of the third image display stage, which is detected for the first time;

determining, by the controller, whether the chromaticity value of the second color is within a third preset chromaticity range;

increasing, by the controller, a sum of times between any two adjacent pulses in the fourth pulse signal in the first display stage in response to determining that the chromaticity value of the second color is not within the third preset chromaticity range.

18. The method according to claim 17, wherein after luminance and chromaticity of the first color are adjusted for a first time, the method further comprises:

receiving, by the controller, an adjusted luminance value and an adjusted chromaticity value of the first color displayed by the microcup in the display stage of the second image display stage, which is detected for a second time;

determining, by the controller, whether the adjusted luminance value of the first color is within the second preset luminance range;

determining, by the controller, whether the adjusted chromaticity value of the first color is within the second preset chromaticity range; and adjusting, by the controller, a pulse width of at least one pulse in the third pulse signal in the second display stage of the second image display stage in response to determining that the adjusted luminance value of the first color is not within the second preset luminance range, and/or the adjusted chromaticity value of the first color is not within the second preset chromaticity range, and after luminance and chromaticity of the second color are adjusted for a first time, the method further comprises:

receiving, by the controller, an adjusted luminance value and an adjusted chromaticity value of the second color displayed by the microcup in the display stage of the third image display stage, which is detected for a second time;

determining, by the controller, whether the adjusted luminance value of the second color is within the third preset luminance range;

determining, by the controller, whether the adjusted chromaticity value of the second color is within the third preset chromaticity range; and adjusting, by the controller, a pulse width of at least one pulse in the fourth pulse signal in the second display stage of the third image display stage in response to determining that the adjusted luminance value of the second color is not within the third preset luminance range, and/or the adjusted chromaticity value of the second color is not within the third preset chromaticity range.

19. An electronic paper display apparatus, comprising:
the first electrode and the second electrode disposed opposite to each other;
the microcup between the first electrode and the second electrode, wherein the microcup includes the first particles of the first color, the second particles of the second color and the third particles of the third color; the charge polarity of the first particles is opposite to the charge polarity of the second particles, and the charge polarity of the first particles is the same as the charge polarity of the third particles; the specific charge of each first particle is greater than the specific charge of each third particle; and the mobility of the first particle is greater than the mobility of the third particle;
a temperature sensor configured to detect an ambient temperature; and
the controller connected to the first electrode and the temperature sensor, wherein the controller is configured to perform the method according to claim 1.

* * * * *